UNITED STATES PATENT OFFICE.

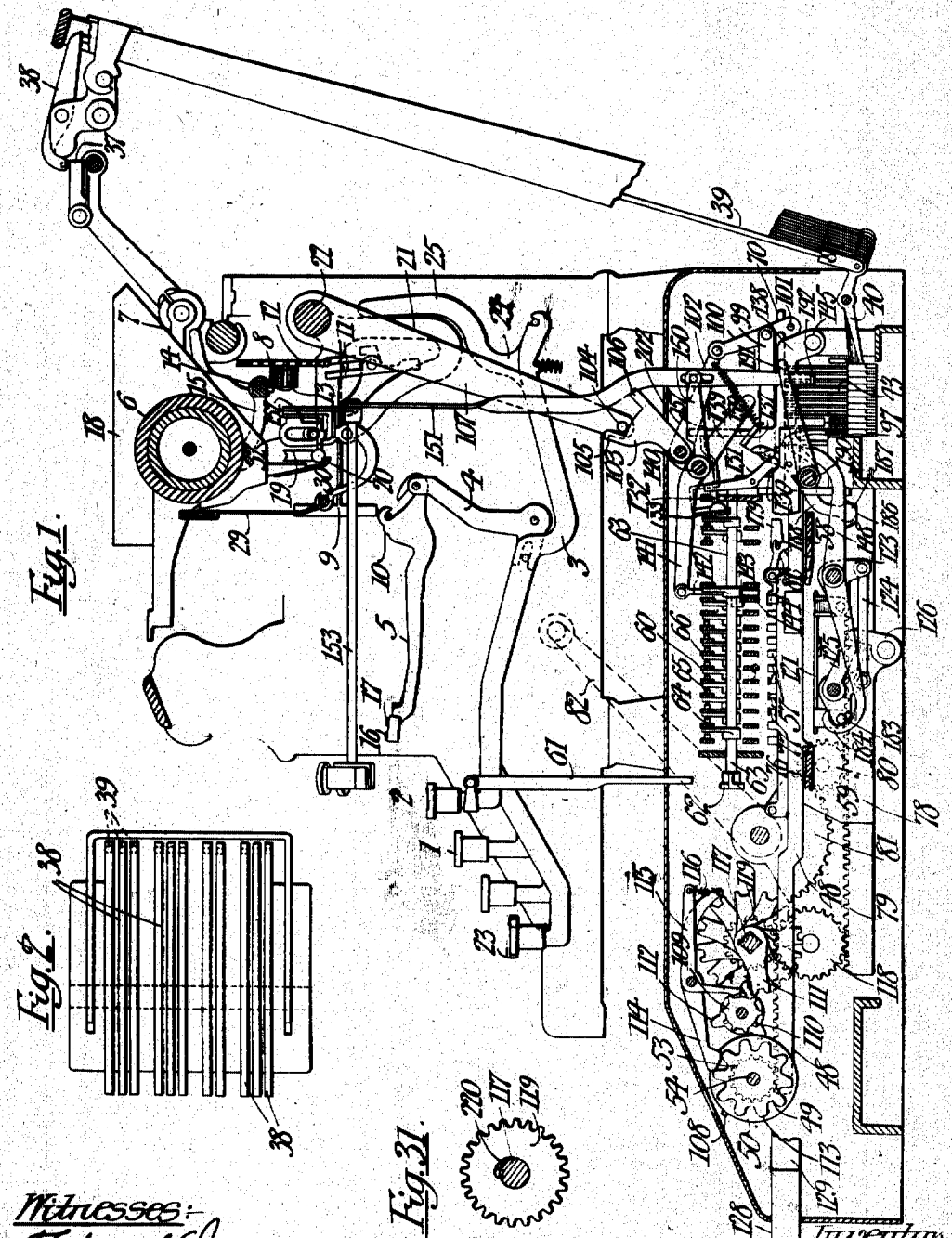

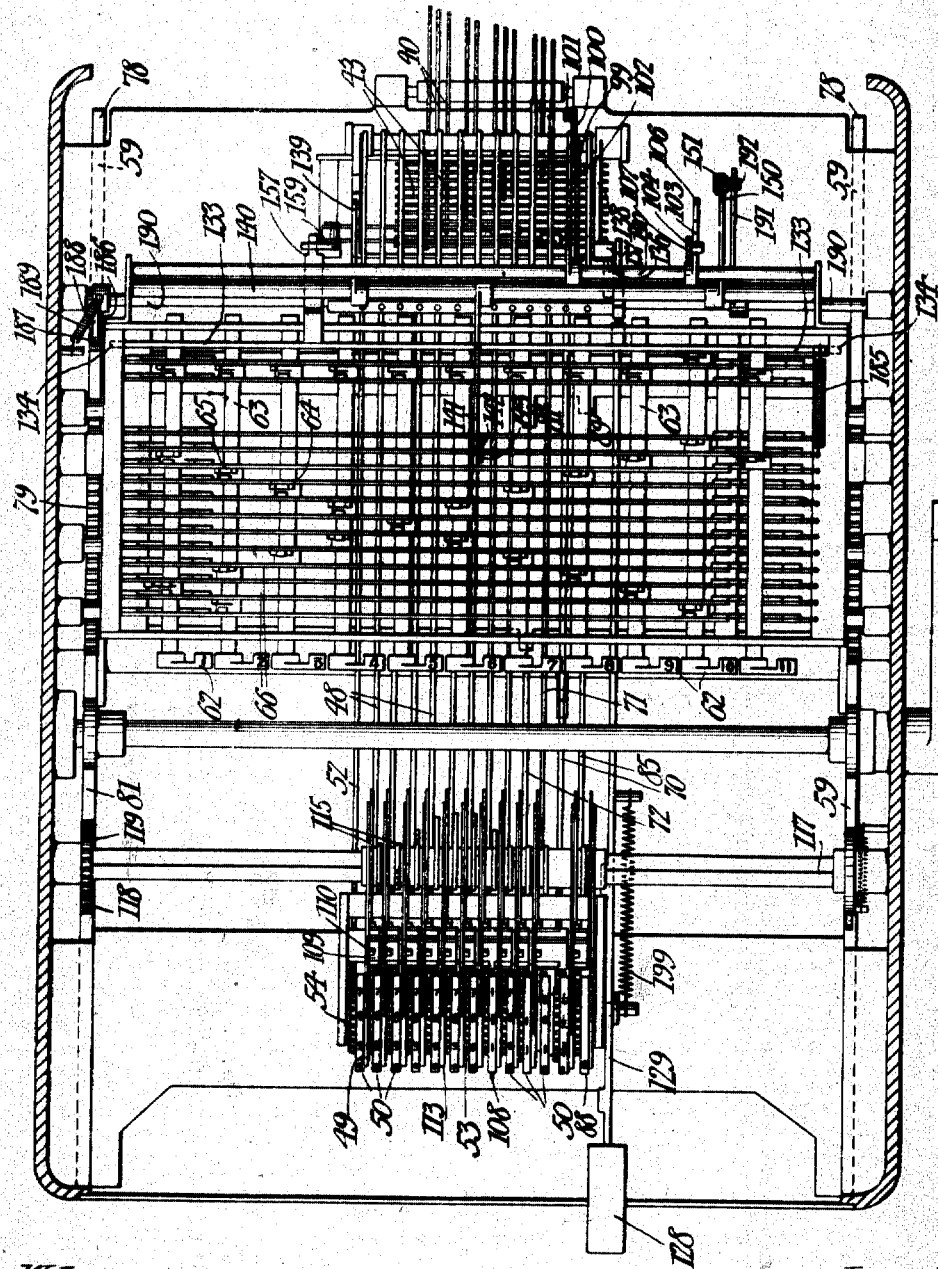

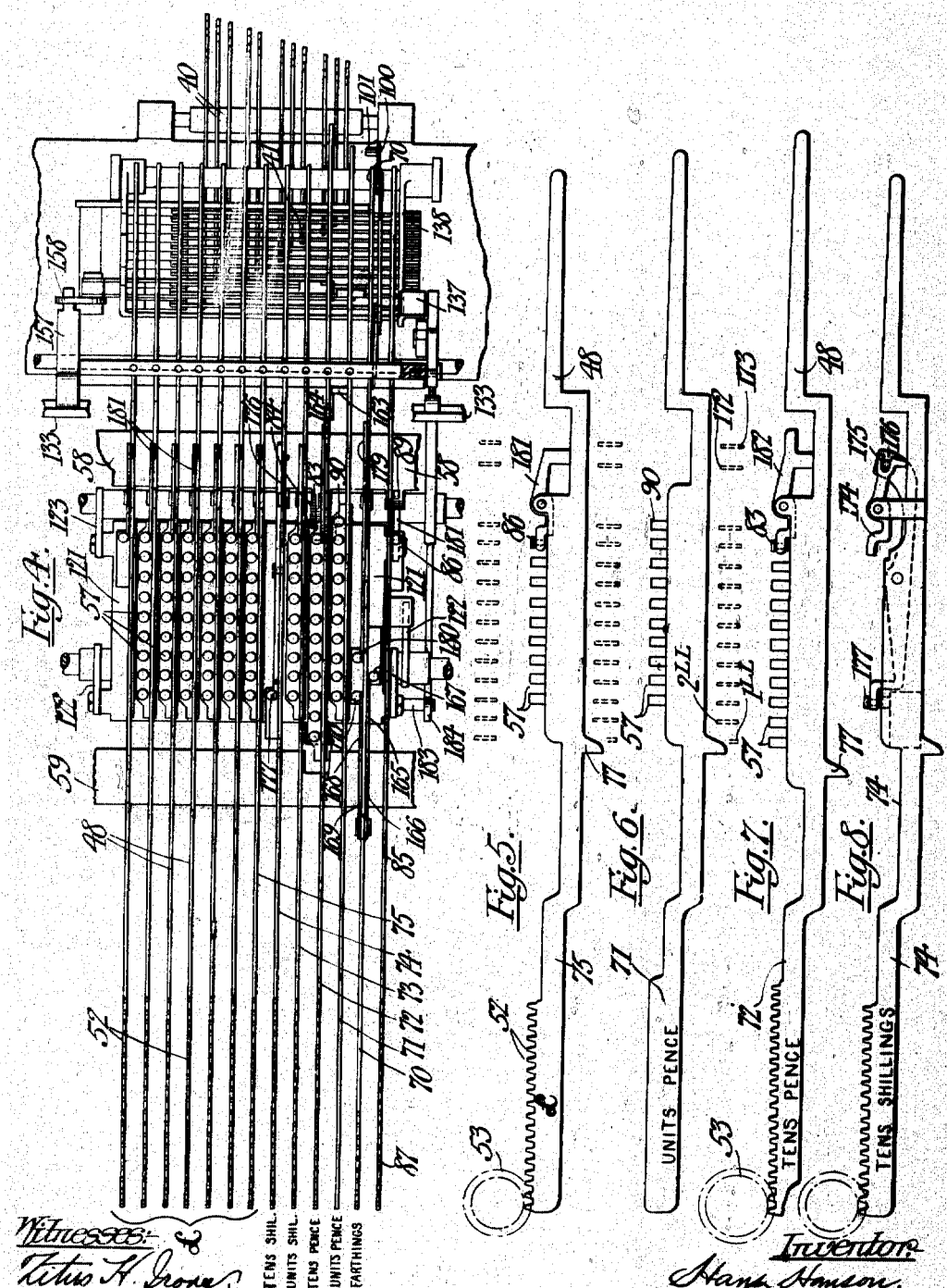

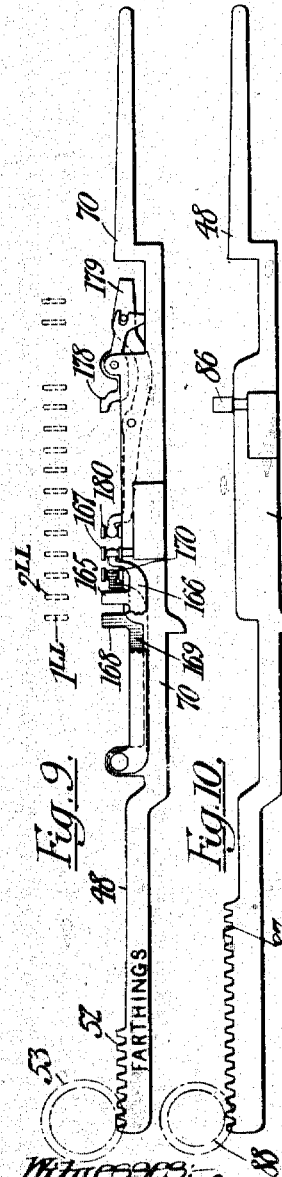
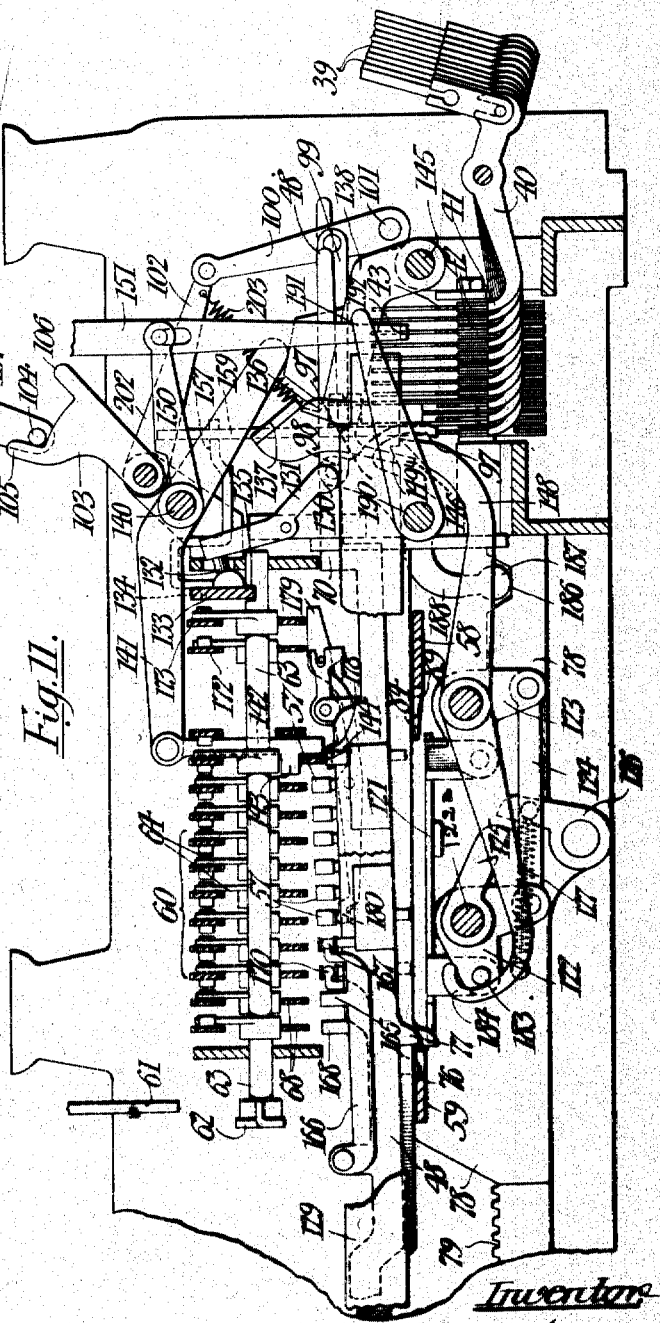

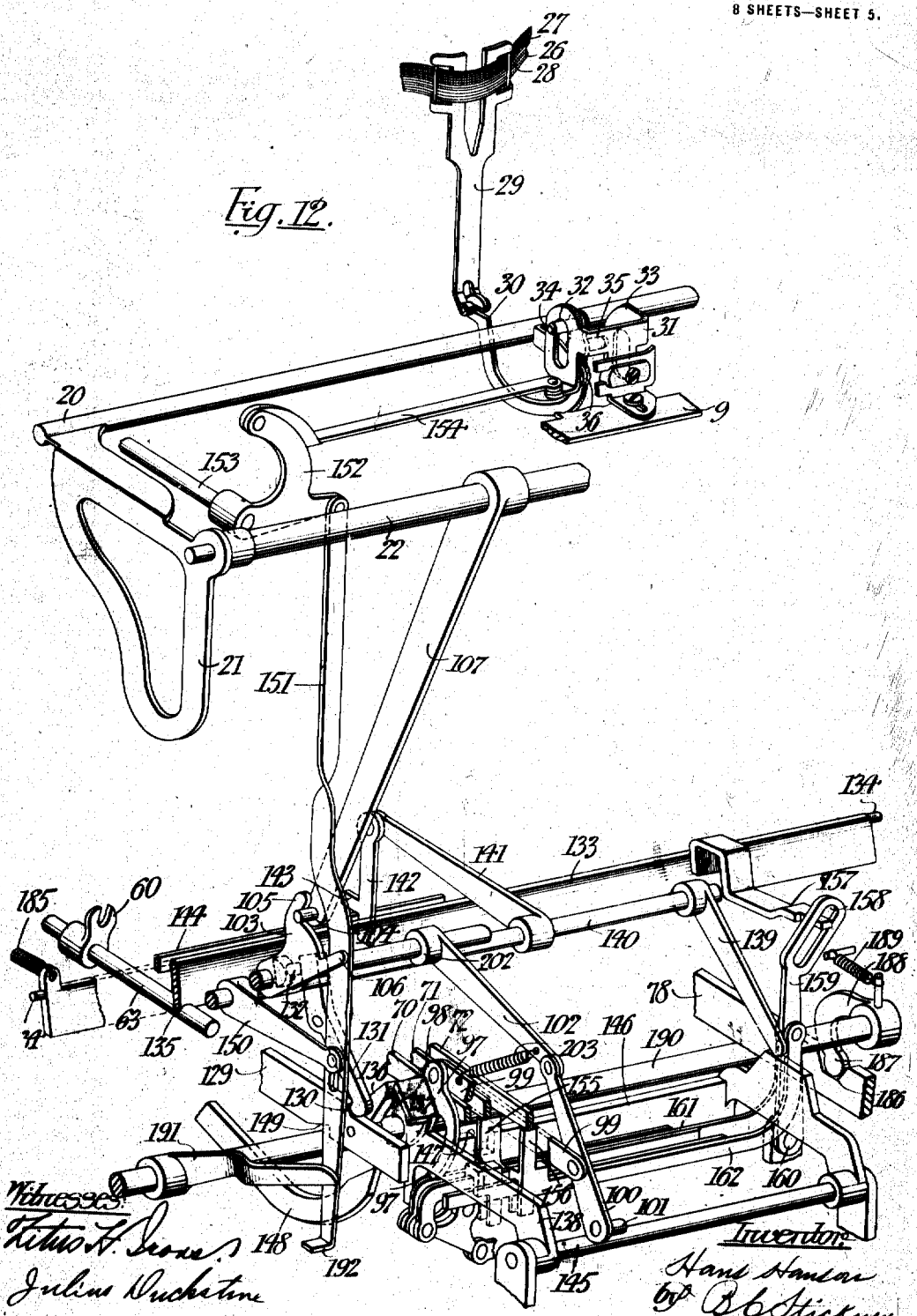

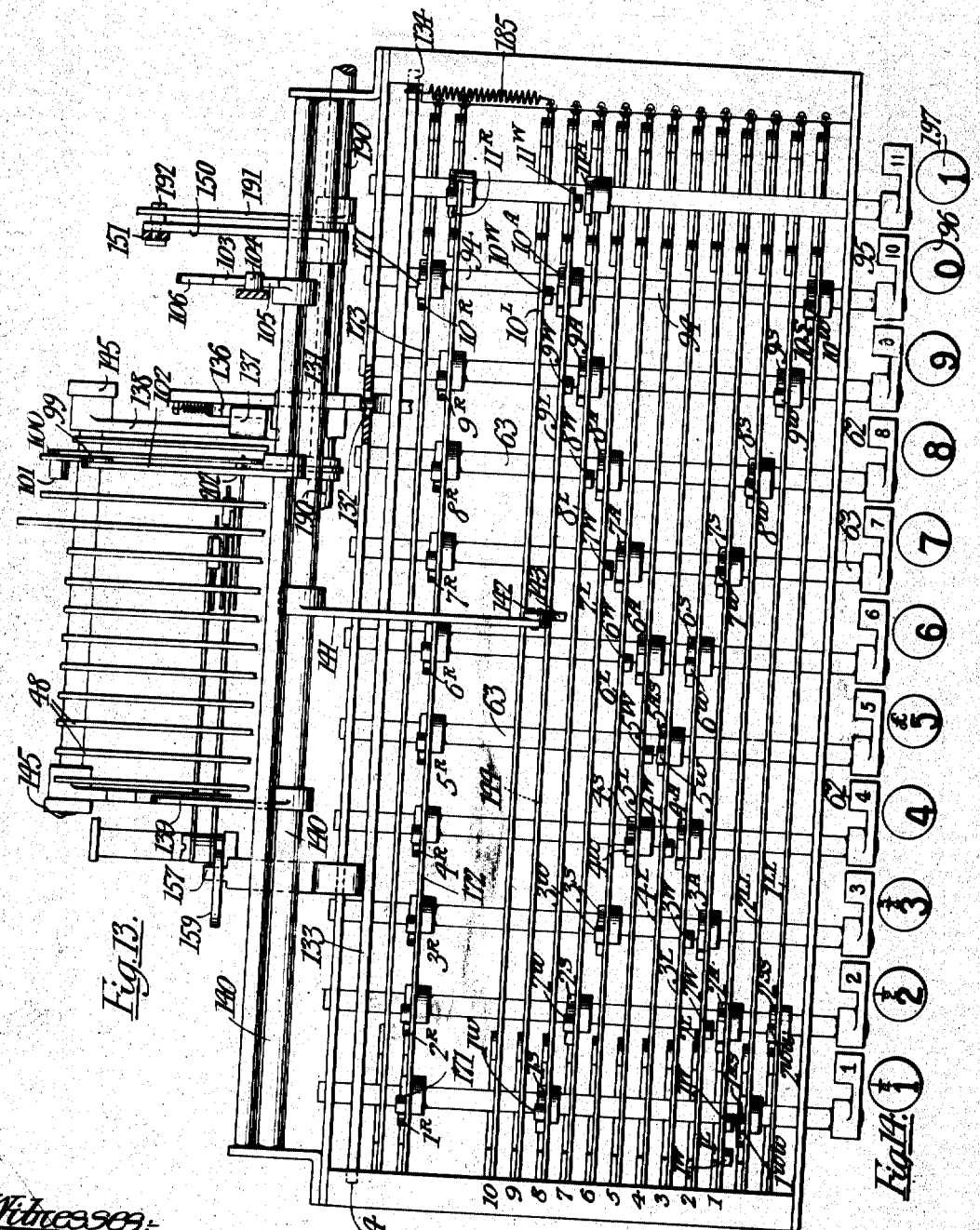

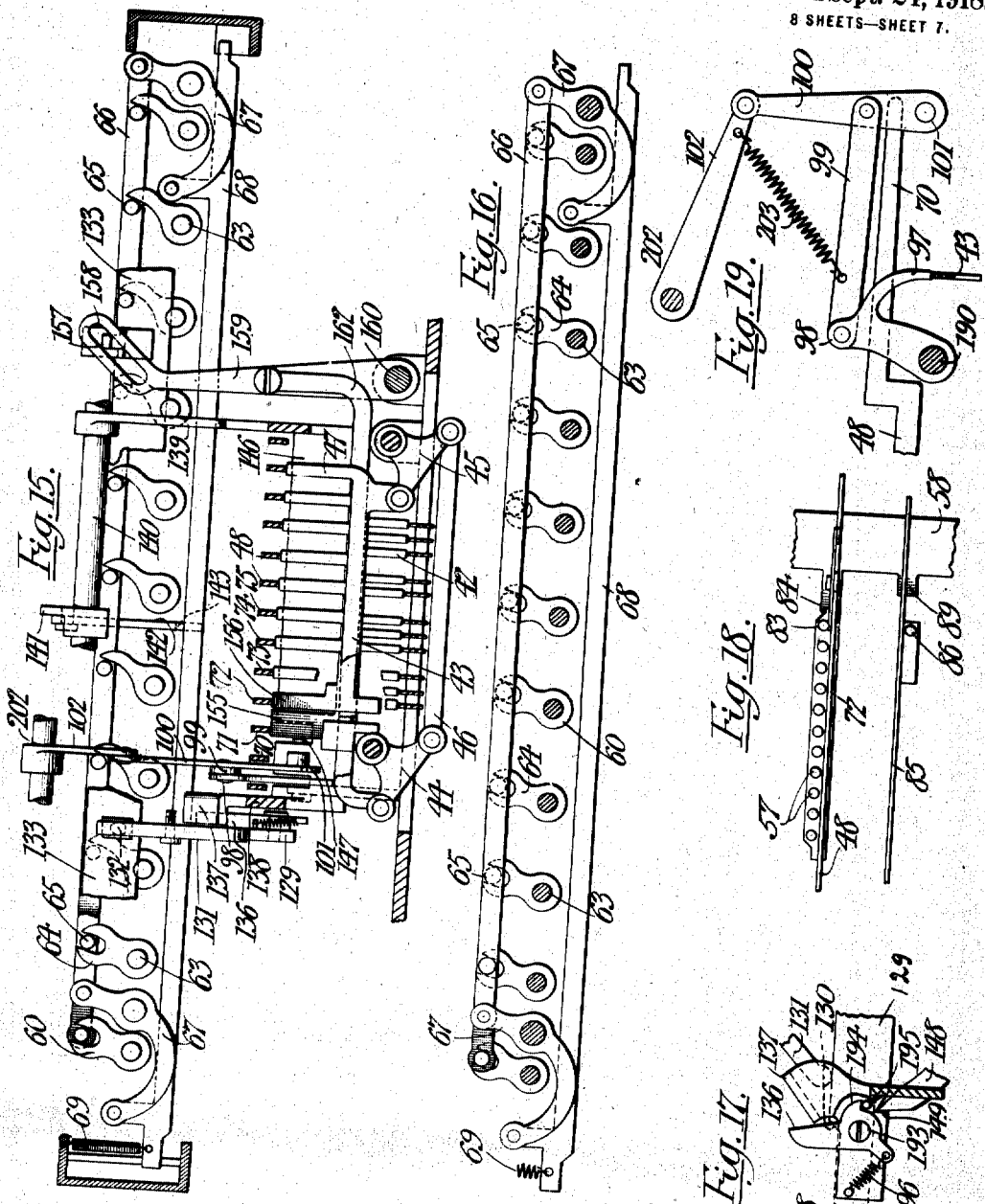

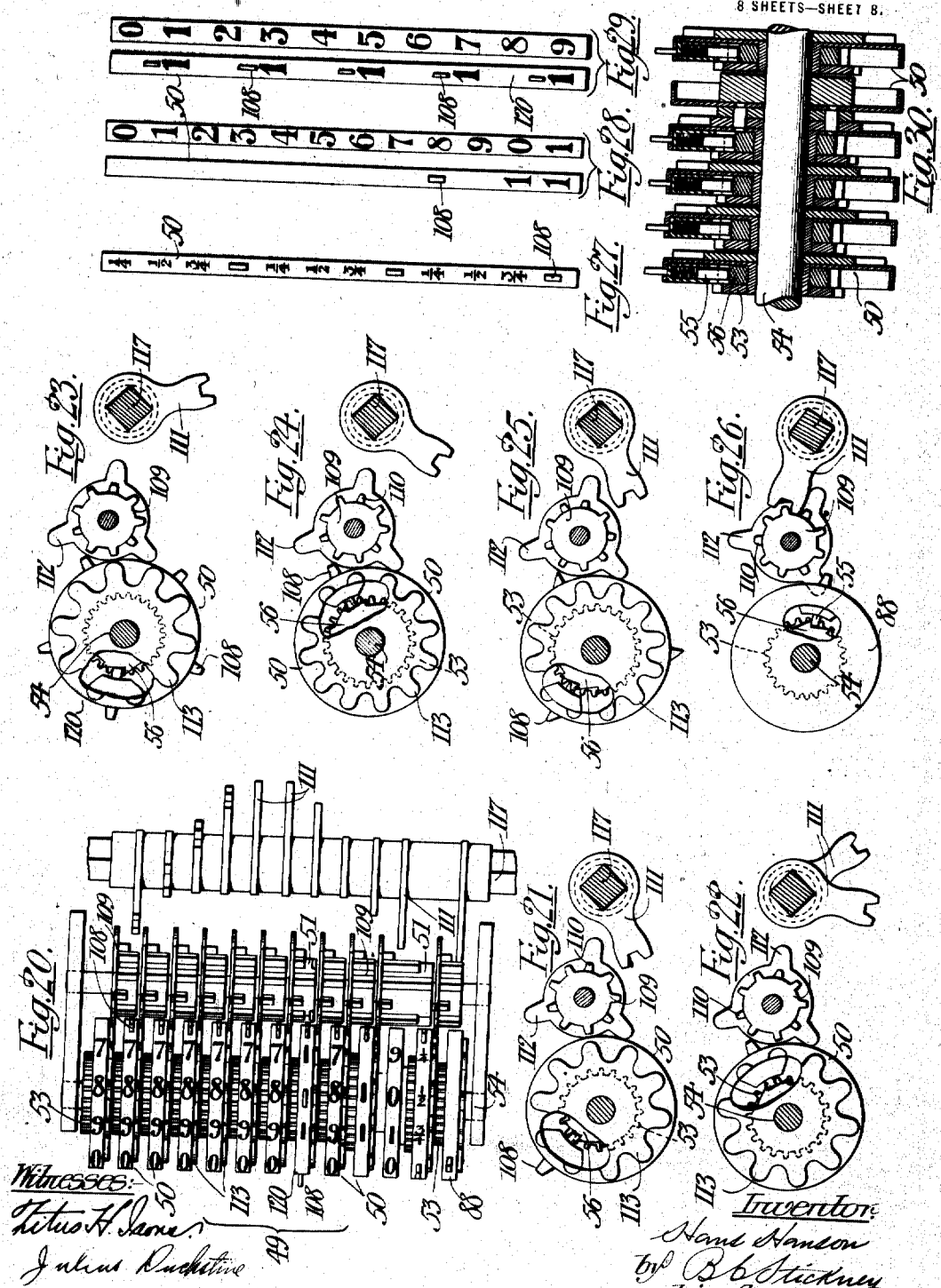

HANS HANSON, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,279,688.  Specification of Letters Patent.  Patented Sept. 24, 1918.

Application filed November 29, 1912.  Serial No. 733,940.

*To all whom it may concern:*

Be it known that I, HANS HANSON, a citizen of the United States, residing in Hartford, in the county of Hartford and State of Connecticut, have invented certain new and useful Improvements in Combined Type-Writing and Computing Machines, of which the following is a specification.

This invention relates to a combined typewriting and computing machine in which numeral keys are caused to set up pins or devices so as to accumulate a computation according to the particular key struck, which computation is subsequently run up on the dial wheels of a register or computing head.

This invention is an improvement on my applications No. 626,550, filed May 11, 1911, and No. 690,281, filed April 12, 1912.

In my application No. 690,281, filed April 12, 1912, I showed how addition could be carried on according to the English or sterling monetary system, which as is well known is as follows:

```
4 farthings make one penny
12 pence     "    "  shilling
20 shillings "    "  pound.
```

In my application No. 626,550 I described mechanism for not only adding but also subtracting, but according to the American or decimal monetary system.

It is the purpose of this invention to provide a machine which will not only add according to the English system but also subtract.

In carrying out this purpose, the computing or dial wheels are always rotated in the same direction, whether for addition or subtraction. To rotate these wheels, rack bars bearing settable pins are connected to rotate the computing wheels in one direction. There is at least one of these rack bars for each order of the system, that is to say, there are bars for farthings, units of pence, tens of pence, units of shillings, tens of shillings, and as many bars as may be desired for units of pounds, tens of pounds, hundreds of pounds, etc. The units of pence bar, however, is advantageously blank or unprovided with a rack, because it preferably acts indirectly through the intermediary of the tens of pence bar, as the units and tens of pence dial wheels are connected so as to rotate in unison. The number of pins on these bars varies according to the order of the bar, and in general is the same as the highest number of which the associated computing or dial wheel is capable of showing. The pins are set by corresponding numeral keys, so as to come at different points into the path of a general operator and thus determine the extent of rotation of the associated computing wheels.

When subtraction is to be carried on, a key is pressed which is arranged to set the pin of highest value on every one of the bars with the exception of the units of pence bar which does not come directly in play during the subtracting operation. This pin, in each case, has a value equal to one less than the exchange value between each order and the next higher order. To illustrate the function, if the general operator should be actuated at this time, the computing or dial wheels would be rotated an amount one less than a complete cycle of each of the dial wheels. In other words, the farthings wheel would be rotated three steps corresponding to three farthings, the tens of pence and units of pence wheels, which move in unison, would be rotated eleven steps corresponding to eleven pence, the units of shillings wheel would be swung through an arc of nine steps, the tens of shillings would be swung one step, and all of the pounds wheels would be rotated nine steps.

A device which may take the fo.m of a special blank dial or computing wheel is provided on the right side of the farthings wheel, so as to be of a lower order than the farthings wheel, and in subtracting this wheel is given a complete revolution by the general operator so as to carry one to the farthings wheel, which in turn will carry one to the pence wheel and so on, whereby all of the computing wheels will have been given an extent of rotation corresponding to exchange value from each order to the next higher order so that they will all exhibit their original showing. That is to say, each computing wheel will be run through a complete cycle which, however, does not mean, in the case of the farthings wheel and the tens of shillings wheel, a complete revolution inasmuch as the numbers of a cycle are repeated in the former three times and in the latter five times on the single circumference of the corresponding wheel.

In subtracting, however, the general operator is not immediately actuated after the highest pin on each bar has been set up by the subtraction key, but the numeral keys are first actuated to cause a writing of the number to be subtracted. The actuation of the subtraction key, however, changed the mechanism for setting the pins so that instead of setting up pins corresponding to the value of the numeral keys struck this mechanism will now set up pins corresponding to the complement of the number of the numeral key struck, using one less than the exchange value of each order as the base or the complete number. For example, if the numeral key "2" were struck while writing in the farthings column for subtraction, the "1" pin will be set up on the farthings bar, there being four farthings in a penny, one less making three, and two from three being one. In each column where a key is struck for subtracting a number the pin of highest value on the bar or the ultimate pin, which has been previously set by the actuation of the subtracting key, will be unset at this time.

In other words, the operation of the subtraction is carried on by adding into the computing or dial wheel the complement of the number struck using one less than the exchange value of each order to the next higher order as the base or complete number, with the provision of adding an extra unit to the lowest order, that is, the farthings wheel, thereby giving the dial wheels a complete cycle of movement less than the value of the numeral key struck.

In carrying out this invention, it has been found convenient to designate the farthings as one-quarter, one-half and three-quarters of a penny, and inasmuch as these characters are upper case characters in the typewriter, means is provided for setting up pins on the farthings bar solely when the machine is in position to write in the farthings column and also solely when the shift key is actuated at the same time, so as to enable the writing of upper case characters.

Provision is also made whereby the shifting of the subtraction key, to cause a subtracting computing operation, will at the same time adjust the ribbon shifting mechanism of the typewriting mechanism, so as to enable the printing in a different color while subtracting from that used while adding.

Other features and advantages will hereinafter appear.

In the accompanying drawings,

Figure 1 is a vertical section taken from front to rear with parts broken away to simplify the showing. In this view the parts are shown in their normal adding positions.

Fig. 2 is a detail top plan view, showing the arrangement of jacks whereby the carriage controls the actuation of the pin bars according to their order or denomination.

Fig. 3 is a horizontal sectional view showing the various pin-setting linkages and connected mechanism. The linkages in this view are arranged so as to be able to perform addition.

Fig. 4 is an enlarged fragmentary plan view, showing the pin bars in detail. With the exception of the bar at the bottom of the view, which is an extra bar for carrying one during subtraction, the bars are arranged from bottom to top of the view according to the following sequence: farthings, units of pence, tens of pence, units of shillings, tens of shillings, units of pounds, tens of pounds, and so on.

Fig. 5 is a diagrammatic detached view in elevation, showing one of the pound pin-bars.

Fig. 6 is a view similar to Fig. 5 of the units of pence pin bar.

Fig. 7 is a view of the tens of pence pin bar.

Fig. 8 is a view of the tens of shillings pin bar.

Fig. 9 is a view of the farthings pin bar.

Fig. 10 is a view which may illustrate either the extra tens-carrying bar next to the farthings bar or the extra correcting bar, (i. e. the pin bar of highest denomination), both of which are used solely in subtracting.

Fig. 11 is an enlarged fragmentary sectional view taken from front to rear, showing the mechanism with the subtraction key actuated so as to shift the pin-setting mechanism to enable the same to set the pins for subtraction and not addition.

Fig. 12 is a skeleton perspective view, showing the relation of the bichrome shifting mechanism to the computing mechanism, and also showing the special means whereby the shifting to write upper case characters controls the setting of pins on the farthings bar, and still further showing the means whereby the units of pence bar is silenced and the tens of pence bar lifted when writing units of pence during a subtracting operation.

Fig. 13 is an enlarged top plan view of the pin-setting linkages, showing the same connected for a subtraction operation.

Fig. 14 is a diagrammatic view of the numeral keys of the typewriter arranged in juxtaposition to the pin-setting mechanisms which they actuate, as shown in Fig. 13. It will be noted in this connection that a special "1" key is provided, and that the zero key is arranged to actuate a special pin-setting linkage, both of which are of use in connection with the computing of pence.

Fig. 15 is a fragmentary sectional view, showing the means for restoring the highest ultimate pins set by the subtraction key, and also showing the means for silencing the units of pence bar and changing the control of the tens of pence bar for subtraction.

Fig. 16 is a fragmentary sectional view, showing in elevation the pin-setting linkages.

Fig. 17 is a fragmentary detail view of the means actuated by the subtraction key for shifting the pin-setting linkages so as to set the pins according to subtraction.

Fig. 18 is a detail top plan view, showing the tens of pence bar and the special tens-carrying bar detached from the others to bring out the arrangement whereby the general operator actuates the former a distance corresponding to two pins in advance of the other bars, and the latter a distance corresponding to one pin in advance, whereby pins which normally correspond to "11" and "10" respectively can be arranged in alinement with the other pins which correspond to "9," so that all of the ultimate or highest valued pins on the bars can be set in subtraction at the same time.

Fig. 19 is a detail view of the mechanism for raising the farthings bar, showing the same actuated by the carriage when the latter occupies a position corresponding to printing in the farthings column, whereby a movement of the shift frame to write upper case characters will lift the farthings bar to permit the pins thereon to be set when the numeral keys are actuated to print "¼," "½," "¾" corresponding to farthings.

Fig. 20 is a detail top plan view of a computing head or register, showing the tens-carrying mechanism.

Fig. 21 is a vertical detail section, showing the tens of pounds train.

Fig. 22 is a view showing the units of shillings train.

Fig. 23 is a view showing the tens of shillings train.

Fig. 24 is a view showing the pence train.

Fig. 25 is a view showing the farthings train.

Fig. 26 is a view showing the special carry over wheel for subtraction arranged on the right side of the farthings wheel.

Fig. 27 is a developed view of the farthings wheel.

Fig. 28 is a developed view of the tens of pence and units of pence wheels which are connected to move in unison.

Fig. 29 is a developed view of the tens of shillings and units of shillings wheels, which, however, are not connected to move in unison.

Fig. 30 is a vertical section through several of the computing or dial wheels.

Fig. 31 is a detail view of the clutch for the drive from the general operator to the carry-over train.

Referring more particularly to the separate parts of this invention as embodied in the form shown in the drawings, 1 indicates character keys and 2 indicates numeral keys which are mounted on key levers 3 (Fig. 1) connected to bell cranks 4 so as to rock the same and swing type bars 5 up against the front side of a platen 6. The platen 6 is mounted on a carriage 7, which is controlled in its travel by an escapement mechanism 8, which includes a universal frame 9 actuated by a shoulder 10 on each of the type bars, so as to rock a pair of pawls 11 which alternately engage an escapement wheel 12 connected to a pinion 13 meshing with a rack 14 movably mounted on the carriage 7 by means of arms 15.

Certain of the keys, as will be seen by reference to Fig. 14, are arranged to print two characters, hence the type bars 5 are provided with two type characters 16 and 17 (Fig. 1). In the case of the numeral keys "1," "2" and "3," they are also used to print the characters "¼," "½" and "¾" (of a penny) corresponding to one, two and three farthings. To enable the writing of these upper case characters, the platen 6 is mounted on a platen frame 18 which carries a roller 19 on its lower end, resting on a rail 20 of a shift frame 21 which is secured to a rock shaft 22 so as to be capable of swinging up and down to lift and allow the depression of the platen 6 with its frame 18. To accomplish this shifting of the platen and its frame, there is provided one or more shift keys 23 mounted on shift key levers 24 having upwardly extending arms 25 bearing against the rear side of the shift frame 21.

The type 16 and 17 on the type bars 5 strike through a ribbon 26 (Fig. 12), which in this case is shown to have a black portion 27 and a red portion 28 so as to be capable of printing at will in either one of two colors. The ribbon 26 is threaded through a guide 29 which is vibrated by means of a bell crank lever 30, which in turn is actuated by a slide 31 mounted to move with the universal frame 9 at each actuation of any numeral key. The slide 31, as is common in the Underwood typewriting machine, is mounted for transverse movement relative to the movement of the frame 9, and has a pair of slotted ears 32 and 33, the slots of which, however, are vertically offset one from the other, so as to engage respectively with pins 34 and 35 located at different distances from the pivot or fulcrum point 36 on the bell crank lever 30. It will be seen that when the ear 32 is in engagement with the pin 34, as shown in Fig. 12, that the ribbon 26 will be vibrated a small amount, bringing the black portion 27 of the ribbon into the path of the type on the type bars. If, however, the slide 31 is shifted toward the left in Fig. 12, the ear 33 will be brought into engagement with the pin 35, enabling a greater oscillation of the lever 30 when a type bar is actuated, and thereby causing a greater upward movement of the ribbon 26 so that the red portion 28 thereof will be brought into the path of movement of the type on the type bars.

The mechanism thus far described is in itself old and well known in the Underwood typewriter, but coöperates with the computing mechanism, which will now be described, to form an operative combination.

Mounted on the carriage 7 so as to travel therewith, there is provided one or more tappets 37 (Fig. 1) according to the number of computing zones desired. Each tappet, as it travels from right to left with the carriage, raises in succession the front end of each one of a series of jacks 38 (Figs. 1 and 2). These jacks depress, at their rear ends, thrust rods 39, which rock bell cranks 40 having upwardly extending fingers 41 (Fig. 11) arranged in echelon, and resting against fingers 42 projecting downwardly from links 43 (see Figs. 11 and 15). The links 43 are pivotally connected to bell cranks 44 and 45, which are also connected together in each instance by a link 46, causing the links 43 to move in parallel. When one of the bell cranks 40 is rocked by its associated jack, it in turn actuates the link 43 with which it is associated, so as to raise the same, whereby a finger 47 projecting upwardly therefrom will raise a rack bar 48 resting thereon. The purpose of these linkages is to effect a transposition, inasmuch as the carriage in moving from right to left goes from higher to lower denominations or orders while the denominations are arranged from higher to lower going from left to right in a computing head 49, the wheels 50 of which are actuated by the rack bars 48.

The rack bars 48, with the exception of the units of pence rack bar, indicated at 71 in Figs. 4 and 6, are each provided with a rack 52 (Figs. 5 and 7 to 10), meshing with a gear 53 loosely mounted on the computing head shaft 54 (Fig. 1). Each of the gears 53 is connected to the corresponding computing or dial wheel 50, as will be seen more clearly by reference to Figs. 21 to 26 inclusive and 30, by a one-way pawl and ratchet mechanism, including a spring-pressed pawl 55 mounted on the computing or dial wheel 50 and a one-way ratchet 56 engaged by the pawl and secured to the gear wheel 53. This enables the racks to rotate the computing or dial wheels 50 when moving forwardly, and permitting the gears 53 to rotate idly during the return motion of the rack bars.

In view of the fact that there are twelve pence in a shilling, the pence wheel, which is double, is divided into twelve divisions, so as to be capable of exhibiting twelve numerals from "0" to "11". The farthings wheel is also divided into twelve divisions, as a cycle for four farthings is repeated three times on the farthings wheel. This also necessitates twelve stopping points of the farthings wheel. The other dial wheels all have ten stopping points in one complete revolution. To enable this variance, both the pence wheel and the farthings wheel have the gears 53, which are connected to rotate them, of greater magnitude than the same gears which are connected to rotate the other dial wheels. In other words, the relation of the gears 53 on the farthings and pence wheels to the gears 53 on the other dial wheels is as twelve to ten.

The rack bars 48 which may be also called denominational or order bars, inasmuch as they determine the order or denomination of the wheel which they rotate, are provided with pins 57 (Figs. 1 and 5 to 8) settable from a position projecting above the rack bars to a position projecting below the rack bars into the path of movement of a cross bar 58 (Figs. 4 and 18) which forms part of a general operator 59. These pins 57 determine the extent of movement of the rack bars by the general operator, and are set by a pin-setting mechanism, indicated in general at 60, which is operated by the numeral keys 2 (Fig. 1).

For this purpose, each of the numeral keys is provided with a depending rod 61, which is adapted to engage an opposite arm 62 secured to an associated rock shaft 63. Each rock shaft 63 is provided with one or more upwardly extending arms 64 which engage wrists 65 on links 66. These links 66 are connected by a pair of bell cranks 67 (Fig. 16) with a parallel link 68, so as to depress the same against the tension of one or more springs 69. Each of the links 68 is arranged above and transversely with respect to the pin-bearing rack bars 48 so as to overlie a transverse row of the pins 57, whereby each link, when depressed, is capable of setting any one of the pins in the subjacent row, which happens to be raised above its fellows, due to the elevated position of its rack bar. As stated above, the rack bar is raised in each instance by the tappet on the carriage actuating the connected transposition linkage when printing is being done in the corresponding denominational or order column of the typewriter.

The number of pins on the several rack bars 48 varies according to the particular order or denomination which the computing wheel associated with the particular rack bar is designed to compute. By reference to Figs. 4 to 10 inclusive, it will be seen that the farthings bar, indicated at 70, has three pins, the units of pence bar 71 has ten pins, the tens of pence bar 72 eleven pins, the units of shillings bar 73 nine pins, the tens of shillings bar 74 one pin, and the pounds, tens of pounds, hundreds of pounds, etc., each have nine pins.

It will be noted in each case that the number of pins on each bar is one less than the exchange value of each order to the next higher order. For example, four farthings make one penny, one less than four is three, there being three pins on the farthings bar; twelve pence make one shilling, one less than twelve is eleven, there being eleven pins on the tens of pence bar, the units of pence bar being in a sense supernumerary, having no rack and acting through the intermediary of the tens of pence bar; ten shillings make one tens of shilling, there being nine pins on the units of shillings bar; two tens of shillings make one pound, one less than two is one, there being but one pin on the tens of shillings bar; and so on.

The general operator 59 includes besides the forward stroke bar 58, a return stroke bar 76 (Figs. 1 and 4) which engages lugs 77 (Fig. 5) on the rack bars 48 so as to return them, and a pair of side plates or bars 76 and 58 connected to the cross bars 76 and 58 and having one or more racks 79. The racks 79 mesh with pinions 80 driven by a sector gear 81 which in turn is operated by any suitable source of power, indicated in this instance by a hand crank 82. The general operator 59 has a definite forward movement, and inasmuch as the highest valued pin 83 of the tens of pence rack bar 72, corresponding to eleven, as will be seen by reference to Figs. 4 and 18, is in alinement with the "9" pin of other rack bars, provision must be made to cause the general operator to move the tens of pence bar 72 a distance corresponding to eleven steps when the highest valued pin is set and proportionate distances for the other pins. For this purpose the general operator is provided with a lug or projection 84 which extends forwardly of the front edge of the bar 58 a distance corresponding to two steps or two pins. It will thus be seen that the tens of pence bar 72 can have a movement two points greater than any of the bars bearing nine pins, in spite of the fact that it has its pin of highest value located in alinement with the "9" pins of these bars.

The same kind of structure is used to give a supplementary bar 85 a greater than normal movement. This bar 85 has but one pin 86 which is arranged in alinement with the "9" pins on most bars and the "11" pin on the tens of pence bar. This bar 85 is provided with a rack 87 which, as will be seen by reference to Figs. 10 and 26, is arranged to rotate a supplementary blank dial wheel 88 one complete revolution in a subtracting operation. This dial wheel 88 is arranged on the right side of the farthings wheel so as to be of the lower order, and, as will be subsequently described, carries one to the farthings wheel during a subtracting operation. As will be seen by reference to Figs. 4 and 18, the cross bar 58 of the general operator is also provided with a lug or projection 89 which extends forward a distance one-half that which the lug 84 extends, or in other words a distance corresponding to one step or pin. Thus instead of the rack bar 85 being moved forward nine points, as would normally occur if the front edge of the bar 58 came in engagement with the pin 86, this rack bar is moved forward ten points so as to give a complete revolution to the blank dial wheel 88.

It will be noted that the pins, with the exception of those on the pence bars and the special tens carrying bar 85, are arranged according to a definte order from "1" to "9" as far as they go in the particular denomination and that the maximum distance which the general operator can move these bars is nine points corresponding to nine units. On the units of pence bar (Fig. 6), it will be seen that there are provided ten pins, one of which, indicated at 90, is located above the ultimate or highest valued pin on all of the other bars. A special linkage is necessary for setting this pin, and is indicated at $10^L$ in Fig. 13. This linkage is similar to the other pin-setting linkages, and is provided with a wrist $10^W$ engageable by a forked arm $10^A$ on a rock shaft 94. The rock shaft 94 is provided with an arm 95 which will be operated by the thrust link 61 on the typewriter key which is adapted to write a cipher, indicated at 96 in Fig. 14. The only time that the cipher key of the typewriting mechanism will cause a setting up of a computing pin for the purpose of computing is when it is struck in the units of pence column corresponding to the striking of ten pence.

The units of pence rack bar 71 is blank, that is, is not provided with a rack, so that it cannot rotate the pence wheels directly. It acts indirectly, however, through the tens of pence rack bar by being provided with a lug or pin 163 (Fig. 4) which engages a projection 164 on the tens of pence rack bar when the units of pence rack bar is carried forward by the general operator engaging a set pin thereon.

It will be noted by reference to Figs. 1, 11, 12 and 13, that the farthings bar 70, which has but three pins, cannot be raised to set the pins except when the shift key 23 is actuated to rock the shift frame 21 and thus lift the platen 6 so as to write upper case characters. The reason for this is that the farthings are printed as "¼," "½" and "¾" of a penny, which characters are printed by the numeral keys "1," "2" and "3" when writing upper case characters. To this end, a lifter 100 (Figs. 12 and 19) will be shifted under the farthings bar indirectly by one of the jacks actuated by the carriage when the latter is in a proper position for writing farthings, so that when the shift frame is raised to write upper case characters, the lifter will be raised to raise the farthings bar. To accomplish this, the farthings link 43, which is raised by the associated bell crank 41 when the corresponding one of the jacks 38 is rocked, underlies a curved arm 97 (Figs. 12 and 19) on a pivotally mounted lever 98 which is connected by a link 99 to the floating lifter 100, the latter having a pin 101 adapted to be brought under the farthings bar 70 when the carriage is in a position to print farthings. The upper end of the hook 100 is pivotally connected to one arm 102 of a species of bell crank lever 202, the other offset arm of which 103 is forked (Figs. 1 and 12) so as to permit a pin 104 to play between the tines 105 and 106 thereof. This pin rocks the bell crank lever 202 against the tension of a spring 203 so as to draw on the lifter 100 and thus raise the farthings bar 70 so that the pins thereon may be set when the corresponding keys are struck. The pin 104 is mounted on an arm 107 which is secured to the pivotal rock shaft 22 which rocks with the swinging movement of the shift frame 21 in raising the platen 6 for upper case characters. It will thus be seen that when the carriage is in a proper position for writing in the farthings column, the hook 100 will be shifted under the farthings bar, so that when the shift key is actuated to write upper case characters the farthings bar will be raised enabling the pins thereon to be set when any one of the keys for writing "¼," "½" and "¾" is subsequently struck. It will be observed that neither the platen shift nor the linkage 43 is able to lift the farthings bar alone; in other words, said bar is effective only during and through the conjoint action of the platen shift and linkage.

The carrying over of one complete exchange value from a lower to a higher order is brought about in a manner similar to that shown in my above-mentioned applications. That is to say, each of the computing or dial wheels 50 is provided with at least one special carry over tooth 108 (Figs. 1 and 20 to 29) which once in a cycle comes in engagement with the teeth of a mutilated gear 109. Every third tooth 110 in each of these mutilated gears is cut away so as to normally offer a blank space to an assisting sector or segment arm 111 arranged to rotate in apposition thereto. However, when the special tooth 108 shifts the mutilated gear 109 through a ninth of a revolution, it will bring the next whole tooth into the path of the corresponding assisting segment 111, so that when the latter is swung around it will rotate the mutilated gear and also a three-toothed gear 112 secured thereto, whereby the latter, which meshes with a gear 113 on the next higher computing wheel, will rotate this next higher computing wheel one step which may be one-tenth of a revolution or one-twelfth of a revolution according to the particular dial or computing wheel.

The dial wheels are held in any adjusted position corresponding to an exhibition of any particular number by detents 114 (Fig. 1) which engage the gears 113. Likewise the mutilated gears 109 are held against accidental rotation by detents 115. Each pair of detents 114 and 115 have a common spring 116 for holding them in action.

The assisting segments 111 are secured spirally on a shaft 117 which is rotated solely during the return motion of the general operator 59 and the crank 82. The assisting shaft 117 is driven from the general operator 59 by a gear 118 which meshes with one of the racks 79, and also meshes with a gear 119 having a one-way clutch connection 220 (Fig. 31) with the shaft 117. This clutch (Fig. 31) is of the ball and cam-socket type, and arranged so as to permit gear 119 to rotate idly during the forward motion of the general operator and to connect the gear 119 with the shaft 117 during the return motion of the general operator.

By reference to Figs. 20 to 29 inclusive, the character and number of special carry over teeth 108 on the various different dial or computing wheels will be seen. In Figs. 21 and 22 corresponding to the pounds and units of shillings computing wheels, there is but one special tooth 108, and there are exactly ten teeth on the gears 113 corresponding to ten numerals, from "0" to "9," which these particular dial wheels are capable of exhibiting.

In Fig. 23, which illustrates the tens of shillings train, it will be seen that the dial wheel is provided with five special teeth 108, the reason for which will be evident by reference to Fig. 29, where it is shown that the tens of shillings wheel, indicated at 120, has five numerals "1" to be exhibited in one complete rotation of the tens of shillings wheel, each numeral "1," however, being spaced apart by a blank space which is arranged to show up intermediate the showing of each digit "1." In this case also the tens of shillings dial wheel has ten teeth on its gear 113. In other words, the tens of shillings dial wheel will complete a cycle five times in a revolution, that is to say, it will carry to the units of pounds wheel five times in every revolution.

By reference to Fig. 24 it will be noticed that the tens of pence wheel and the units of pence wheel, which are secured together so as to move in unison, are provided with but one tens-carrying tooth 108, so that a cycle is completed but once in an entire revolution of this combined computing wheel. The gear 113, however, of this computing wheel is provided with twelve teeth corresponding to the twelve steps of which the computing wheel is capable, which will be seen by reference to Fig. 28 to run from "0" to "11."

By reference to Fig. 25 it will be observed that the farthings computing or dial wheel is provided with three of the special carry over teeth 108, so that the farthings wheel will carry once in every third of a revolution, that is to say, it completes a cycle three times in every revolution of the dial wheel. The gear 113 in this instance is provided with twelve teeth similar to the pence gear in Fig. 24, inasmuch as the farthings wheel also has twelve steps, that is, "blank," "¼," "½," and "¾" repeated three times.

When the register is "cleared" (i. e. set to zero) prior to starting new work, the dial wheels of the tens of shillings and the farthings will rotate a greater or less distance depending on their position relative to the means for setting the dial wheels to zero or a blank space. Inasmuch as these two dial wheels are provided respectively with five and three special carry over teeth 108, provision must be made to prevent the dial wheels from actuating the corresponding mutilated gears 109 more than once. For this purpose, every second one of the whole teeth is cut away or provided with a slot 51 (Fig. 20), so that after it has been set by one of the special teeth 108 any succeeding ones of the special teeth, which may come around in moving the dial wheels to zero, will not actuate the associated gear 109, so that it will only be set once for carrying over in a specific zero-clearing operation.

The pins 57, after having controlled the extent of movement of the rack bars on which they are mounted, are restored at the return of the general operator in the usual manner. For this purpose, there is provided a pin-restoring plate 121 (Figs. 1 and 4) which is pivotally connected to a plurality of bell crank levers 122 and 123 (Fig. 11). These bell crank levers are connected by a pair of links 124 so as to maintain the plate 121 always in a horizontal position. The bell crank levers 122 are fixed to a shaft 122ª having secured thereon an arm 125 which is engaged by a one-way pawl 126 on the general operator during the return motion thereof, so as to rock the bell crank lever 122 and raise the pin-restoring plate 121 until it has forced all of the set pins back to their normal raised position. The pawl 126 is permitted by a spring 27 to slip idly by the arm 125 during the forward motion of the general operator without lifting the plate 121.

For the purpose of subtraction there is provided a subtraction key 128 (Figs. 1 and 3) which may be pushed against the tension of a return spring 199 so as to slide rearwardly a thrust rod 129 which is provided at its rear end, as will be seen by reference to Figs. 1, 12 and 17, with a cam 130 arranged to rock a lever 131 bearing at its upper end by means of a pin 132 against a shift bar 133. The shift bar 133 is pivoted at its upper edge by means of pins 134, and rests at its lower edge in slots 135 in all of the rock shafts 63 so that when it is rocked by the rocking of the lever 131, it will shift them from a rearward position to a forward position. This positions all the rock shafts so that instead of setting the pins for addition they will now set for subtraction.

The thrust rod 129 in moving rearwardly not only changes the action of the pin-setting mechanism, but also forces a pivotally mounted pawl 136 (Figs. 11 and 17) thereon rearwardly, so that the latter cams upwardly an inclined lug 137 on a frame 138 mounted on a rock shaft 145. The frame 138 is thus raised at its front end so as to in turn swing upwardly an arm 139 resting thereon. The arm 139 in turn rocks a shaft 140 to which it is secured and which also has secured thereon an arm 141 which is depressed so as to force downwardly a thrust link 142. The thrust link 142 is provided with a finger or lug 143 which overlies a link 144 forming, as will be seen by reference to Figs. 1 and 11, the lower link of a pin-setting linkage 9ᴸ. This linkage is for the purpose of setting all of the pins corresponding with the "9" pins, that is to say, all of the pins of the highest ultimate value with one exception, the units of pence.

It is necessary, however, before the pins can thus be set, that all of the bars on which the pins are to be set shall be moved up to their raised position. For this purpose, the frame 138 has depending therefrom a lifting hanger having a cross bar 146 which will be lifted when the subtraction key rocks the frame 138. It will be noted by reference to Fig. 15, however, that the cross bar 146 although underlying all of the pin-bearing rack bars is provided with a groove or rabbet 147 underlying the units of pence bar 71, so that this bar will not be raised and thus no pin will be set thereon.

The link 144 of the "9" pin-setting linkage 9ᴸ does not overlie all of the pins of highest ultimate value in all of the orders. The exceptions to be noted are the single pin 177 on the tens of shillings bar 74 and the "3" pin 180 on the farthings bar 70. To set the single pin on the tens of shillings bar when the subtraction key is operated, one end of a lever 174 which underlies the link 144 of the 9ᴸ pin-setting linkage is depressed when the linkage is actuated, so that the opposite end thereof is raised to raise one end of a lever 176 to which it is connected by a pin-and-slot connection 175. This lever 176, which is pivoted intermediate its ends, is arranged to engage a reduced portion on the single pin 177 on the tens of shillings bar 74, so that it will depress the same when the link 144 is depressed, setting this pin up so that it will enable a one-step movement of the associated tens of shillings wheel, in case no number is subtracted in the tens of shillings column. In the case of the farthings bar, as will be seen by reference to Fig. 9, a similar arrangement is used. One end of a lever 178 projects beneath the link 144 on the 9$^L$ pin-setting linkage, and is bifurcated at its opposite end so as to raise one end of a lever 179. When it is rocked, the opposite end of this lever is depressed and carries with it the "3" pin 180 corresponding to three farthings or three-quarters of a penny.

As soon as the pawl 136 has performed its function in raising the frame 138 to set the pins which correspond to the "9" pins, it will slip by the inclined lug 137, so that the link 144 is free to return to its original raised position and the cross bar 146 is free to drop, permitting the various pin-bearing rack bars to return to their normal lowered position. The subtraction key itself, however, and the thrust rod 129 secured thereto are caught in their rearwardly thrust position by a detent 148 which engages a notch 149 in the under surface of the thrust rod 129. All of the pin-setting rock shafts 63 will therefore be held in their forward position, corresponding to a subtraction setting of the pins, until a subtraction operation has been completed.

We will consider at this point how the bichrome mechanism is changed so as to write red instead of black when the subtracting operation is carried on. When the shaft 140 (Fig. 12) is rocked at the rearward plunging of the subtraction key 128, an arm 150 secured thereon is also rocked upwardly so as to push up on a link 151 which is connected at its upper end to a bell crank lever 152. The bell crank lever is secured to a rock shaft 153 and pulls over, through the intermediary of a link 154, the slide 31 so that in place of the ear 32 and the pin 34 being in coöperation, the ear 33 and the pin 35 will be in coöperation. This enables a greater movement of the ribbon-bearing vibrator or guide 29 so as to bring the red portion of the ribbon 26 in the path of movement of the type bars.

For a subtracting operation, the units of pence bar 71 is not used at all, but when writing in the units of pence column, the tens of pence bar 72 is raised, so that for whatever number is struck to be written in the units of pence column, the complement of the corresponding number will be set up on the tens of pence bar. To accomplish this, in place of the normal upstanding finger or projection 47 found underlying all of the other pin-bearing rack bars 48, the units of pence rack bar and the tens of pence rack bar are adapted to be operated by shiftable upstanding fingers. Considering this feature in detail, slidingly mounted on the link 43, corresponding to the units of pence bar which will be raised when writing in the units of pence column, there is provided a shiftable finger 155 (Figs. 12, 13 and 15). Similarly there is provided a shiftable finger 156 slidingly mounted on the link 43 which will be raised when writing in the tens of pence column. The finger 155, however, is about twice as wide as the finger 156, so that when both fingers 155 and 156 are shifted to the right in Fig. 15, while the finger 156 will come in a silent position in register with the space between the tens of pence bar 72 and the units of shillings bar 73, so as to be incapable of raising any pin-bearing rack bar, the units of pence finger 155 will pass from under the units of pence rack bar 71 to a position beneath the tens of pence rack bar 72.

Under these circumstances, when writing in the tens of pence column, no rack bar will be raised, and no pin will be set. However, when writing in the units of pence column, the tens of pence rack bar will be raised, and pins corresponding to the complement of the key struck will be set up on the tens of pence bar 72. The fingers 155 and 156 are slid over to their subtracting position at the actuation of the subtraction key 128. To accomplish this, the shift bar 133 (Figs. 12 and 15), which moves all of the pin-setting shafts 63 forward, has secured thereto an arm 157 which is reduced to a finger so as to extend into an inclined slot 158 on a lever 159. The lever 159 is pivoted at 160, and has pivotally connected thereto slides 161 and 162 which straddle the links 43 corresponding to the pence columns and have the fingers 155 and 156 mounted thereon. It will thus be seen, when the shift bar 133 is rocked to change the pin-setting linkages from their adding setting state to their subtracting setting state, that the lever 159 will be rocked at the same time, thereby drawing the fingers underlying the units and tens of pence rack bars 71 and 72 from their position shown in Figs. 12 and 15 to their subtracting position.

The pin-setting linkages will now be described in detail. Referring to Figs. 3, 13 and 14, when the pin-setting mechanism is set for adding, as shown in Fig. 3, the arms on the shafts 63, which have been referred to in general by the numeral 64, and certain of which are now referred to specifically according to the numeral key and the character of operation to which they correspond as $1^{AS}$, $2^A$, $3^A$, $4^A$, $5^{AS}$, $6^A$, $7^A$, $8^A$, $9^A$, $10^A$, and $11^A$ will engage respectively with wrists $1^W$, $2^W$, $3^W$, $4^W$, $5^W$, $6^W$, $7^W$, $8^W$, $9^W$, $10^W$ and $11^W$ on links $1^L$, $2^L$, $3^L$, $4^L$, $5^L$, $6^L$, $7^L$, $8^L$, $9^L$, $10^L$ and $9^L$. It will be noted that both the $9^A$ adding arm and the $11^A$ adding arm are connected to operate the $9^L$ link corresponding to the actuation of the highest ultimate row of pins.

When the shafts 63 are shifted for subtraction, the arms "$1^{AS}$" to "$11^A$" inclusive will be shifted out of connection with the corresponding links and a set of arms on the same shafts 63 and corresponding to the respective numeral keys, as indicated in Fig. 14, will be shifted into engagement with the apposite wrist pins on the various links. To be specific, arms $1^S$, $1^{AS}$, $2^S$, $2^{SS}$, $3^S$, $4^S$, $5^{AS}$, $6^S$, $7^S$, $8^S$, $9^S$ and $10^S$ will be brought into coöperative engagement with wrists $1^W$, $1^{WW}$, $2^W$, $2^{WW}$, $3^W$, $4^W$, $5^W$, $6^W$, $7^W$, $8^W$, $9^W$ and $10^W$ on the links $8^L$, $2^{LL}$, $7^L$, $1^{LL}$, $6^L$, $5^L$, $4^L$, $3^L$, $2^L$, $1^L$, $2^{LL}$ and $1^{LL}$ respectively. It will be noted in this connection that the arms $1^{AS}$ and $5^{AS}$ are used for both adding and subtracting. It will also be noted that there are two subtracting arms $2^S$ and $2^{SS}$ for the numeral key "2". The first of these, $2^S$, is used in the normal decimal subtraction of two as in pounds and shillings, and the other, $2^{SS}$, for subtracting two in duo-decimal and quaternary orders as in pence and farthings. The reason for this arrangement is to enable each key in subtracting to set up a pin corresponding to the complement of the value of the key, using one less than the exchange value of each particular order to the next higher order as a base or complete number.

The reason for the extra pin-setting links $2^{LL}$ and $1^{LL}$ will be evident by reference to Figs. 5, 7 and 9. If we want to subtract ten pence, as stated above, the units of pence bar is not in action during substraction, but the tens of pence bar will be raised. When we write ten pence we strike the 0 key to write a cipher in the units of pence column, and as will be seen by reference to Fig. 13, this key will cause the arm $10^S$ to rock and thus actuate the pin-setting linkage $1^{LL}$ which, as will be seen by reference to Figs. 4 and 11, will set the lowest valued pin on the tens of pence bar or the pin which is two points outside of the normal row of "1" pins. That is to say, the exchange value of pence is twelve, one less than twelve is eleven, and subtracting ten from eleven leaves one, so that the "1" pin must be set up. Similarly if we desire to subtract nine pence, the "9" key would be struck, and would actuate the linkage $2^{LL}$ which would set up the number "2" pin on the tens of pence bar to cause a rotation of two points of the combined pence and units of pence computing or dial wheel.

If we desire to subtract in farthings, it will be seen by reference to Figs. 9 and 13, that if we subtract one farthing, the "2" pin must be set up. The reason for this is that two is the complement of one, using one less than the exchange value (four), which is three, as the base in obtaining the complement. Therefore the $2^{LL}$ linkage is actuated when the numeral key "1" is struck, so as to strike an upstanding finger 165 (Fig. 9) on a lever 166, which is connected to the "2" pin 167 on the farthings rack bar 70. Hence the "2" pin would be set up to move the farthings wheel two steps. Likewise, if we desire to subtract two farthings, the numeral key "2" would be struck, causing a rocking of the arm $2^{SS}$ (Fig. 13) which will actuate the linkage $1^{LL}$ corresponding to the complement of two, using one less than four as a base, so that this linkage will come in engagement with an upstanding finger or lug 168, (Fig. 9) on a lever 169 pivotally mounted on the farthings bar 70, and engaging the "1" pin 170 of the farthings bar 70. The "1" pin will thus be set up to cause a one-step movement of the rack bar and the associated farthings dial wheel.

It is pointed out in passing that although the special links $2^{LL}$ and $1^{LL}$ each have two operating arms to actuate them, they will not interfere with each other in the least by setting up the wrong pins, inasmuch as the farthings bar and the tens of pence bar will only be raised when writing respectively in the farthings and tens of pence columns. Further, inasmuch as the exchange value for pence is two greater than the exchange value of the decimal orders, and as the pins of the tens of pence bar are offset two points with respect to those of the other bars, the striking of the keys less than nine for subtracting will correspond in pence exactly with the striking of the same keys for the decimal orders.

Inasmuch as when the subtraction key was set the pins having the highest ultimate value on all of the rack bars were set up, it is necessary to restore these pins when other pins are set up on the same rack bars. To accomplish this, each of the rock shafts 63 is provided with a restoring arm lettered respectively for the separate "1," "2," "3," "4," "5," "6," "7," "8," "9," "0," and special "1" keys $1^R$, $2^R$, $3^R$, $4^R$, $5^R$, $6^R$, $7^R$, $8^R$, $9^R$, $10^R$ and $11^R$ which engage wrist pins 171 on a pin-restoring linkage 172 in the case of the arms $1^R$ to $9^R$ inclusive and $11^R$ and on a pin-restoring linkage 173 in the case of the pin-restoring arm $10^R$. The reason for having the pin-restoring linkage 173 for the "0" or "10" train is because the only time that it will be necessary to calculate ten is when "0" is struck in the units of pence column for subtracting ten pence. Any other time that "0" is struck, as for example when subtracting ten pounds or ten shillings, it would not make a correct calculation to restore the ultimate pin on the units of shillings bar or on the units of pounds bar as we desire to leave the units of shillings and the units of pounds the same when nothing is subtracted from them. Inasmuch as the exchange value from pence to shillings is twelve instead of ten, it is necessary to restore the highest or ultimate pin corresponding to "11" when "0" is struck to subtract ten pence.

To restore the highest ultimate pin on all of the pounds bar and the units of shillings bars, each of the "9" pins is provided with a reduced portion engaged by a lever 181 (Figs. 4 and 5) pivoted intermediate its ends, and with its rear end projecting under the pin-restoring linkage 172. In the case of the tens of pence bar (Fig. 7), there is provided a similar lever 182 which engages the highest valued pin 83 and not only projects under the pin-restoring linkage 172, but also projects under the pin-restoring linkage 173. The levers 176 and 179 for the tens of shillings highest pin and the farthings highest pin respectively also project beneath the pin-restoring linkage 172.

By this arrangement, after the subtraction key has once been shifted to arrange the pin-setting linkages according to their subtracting state as each numeral key is struck the pin of highest ultimate value of the particular order being written in, which was set up by the subtraction key, will be returned to its normal position and a pin corresponding to the complement of the key struck will be set up, using as a base or complete number one less than the exchange value of the order being written in to the next higher order. The exchange value, of course, in this English system, as pointed out above, is not the same between every two orders, but the machine automatically takes care of this difference, in the manner pointed out above.

In this type of machine, arrangement is made whereby the mechanism will complete but one subtracting operation for a single actuation of the subtraction key. This is accomplished by returning the mechanism to its normal adding state after the completion of a subtracting operation. To do this, use is made of the final return movement of the general operator. There is provided on the bell crank lever 122, which is actuated to lift the pin-restoring plate 121 in restoring all of the set pins, a wrist 183 (Figs. 1 and 11) which is located so as to engage a hook 184 on an extension of the detent 148, so that the detent will be rocked when the pin-restoring plate is lifted, thereby releasing the thrust rod 129 on the subtraction key 128, permitting the subtraction key to return to its unset position. This likewise permits the shift bar 133 to return to normal position under the tension of a spring 185 (Fig. 13), thereby shifting all of the rock shafts 63 and the associated arms, which actuate the pin-setting linkages, back to adding position.

When the subtracting operation is changed once more to adding, it is likewise desirable to change the printing from red back into black. For this purpose, one of the side plates or bars 78 of the general operator is provided with a cut-out groove or rabbet 186 (Fig. 11) in which normally rests an enlarged following end 187 on a bell crank 188. A spring 189 holds the bell crank in its normal position, shown in Figs. 11 and 12, with the enlargement of the bell crank in the rabbet 186. However, when the general operator moves forward to run up the subtraction computation accumulated, the follower 187 will be cammed up onto the top of the side bar 78, so as to rock a shaft 190 on which the bell crank 188 is secured. There is also provided on the rock shaft 190 an arm 191 which will be depressed during the rocking of the shaft 190, so as to strike an overturned projection or finger 192 on the link 151, shifting the link 151 down so that it will shift the slide 31 over into the position shown in Fig. 12, bringing the ear 32 into engagement with the pin 34, enabling a minor movement of the ribbon guide 29.

In returning with the subtraction key 128, the pawl 136, as will be seen by reference to Fig. 17, will snap idly by the inclined projection 137 without raising the frame 138. To accomplish this, the pawl 136 is pivotally mounted at 193, and is held in a normal position with a shoulder 194 thereon against a pin 195 by means of a spring 196. The spring 196 will yield, however, to permit the pawl 136 to snap idly by the inclined projection 137 during the return movement of the thrust rod 129 and the subtraction key 128 to their normal inactive position.

In the operation of the device, for adding, the numeral keys are struck as usual when the carriage is in a computing zone. The tappet on the carriage will operate the jacks and linkages successively, so as to raise the rack bars in proper sequence, whereby the accordant rack bars will be raised to enable the pins to be set thereon, when printing in corresponding orders or columns on the typewriter.

In the case of farthings, the jack and transposition linkage actuated by the tappet on the carriage, will place the lifter 100 so that the farthings bar 70 can be raised. It is then necessary to actuate one or the other of the shift keys so that the platen is lifted to write upper case characters. The shift frame for the platen will thus act, through the intermediary of the arm 107 and the bell crank and connecting arm, to raise the lifter 100, thus raising the rack bar 70.

The numeral keys "1," "2" or "3" can be then pressed to write either "¼," "½" or "¾" corresponding to one, two and three farthings.

When adding eleven pence, it is necessary to strike the special "1" key 197 when writing in the tens of pence column, so as to set up the highest ultimate pin, which in this case is the "11" pin.

When the pins are set up for all of the digits of a complete number, then the general operator is run forward in the usual manner by the actuator or crank 82, so that the cross bar 58 thereon will come into engagement with the several set pins. In the case of the tens of pence bar, however, the lug or projection 84 has a lead of two steps over the rest of the cross bars, thereby moving the tens of pence rack bar two points greater than any other rack bar can be moved for the alined pin. The units of pence bar 71 does not act directly on the combined units and tens of pence computing wheel, but transmits any movement which it has, due to pins set up thereon indirectly through the lug 163 and the projection 164, to the tens of pence bar, which is connected by a rack and pinion to the composite pence computing wheel.

The carrying over from one order to the next higher order takes place during the return motion of the crank 83 in the regular manner. Any mutilated gear 109, which may happen to have been set up by a special tooth 108 on the associated computing wheel, by the latter coming into engagement therewith at the completion of a cycle for that computing wheel, will have its movement completed by the engagement of the associated segment 111 which is rotated solely during the return motion of the general operator, so that the gear 112 connected thereto will advance the gear 113 and the connected computing wheel of the next higher order one step.

To enable a subtracting operation, the subtraction key 128 is pressed rearwardly and is caught in its subtracting or active position by the detent 148. In moving rearwardly, the subtraction key, through the intermediary of the cam 130, rocks the lever 131 so as to force the shift bar 133 forward against the tension of its spring, thereby shifting all of the rock shafts 63 bearing the setting arms, so that the adding arms $1^{AS}$, $2^A$, $3^A$, $4^A$, $5^{AS}$, $6^A$, $7^A$, $8^A$, $9^A$, $10^A$, and $11^A$ will be thrown out of operation and the subtraction arms $1^S$, $1^{AS}$, $2^S$, $2^{SS}$, $3^S$, $4^S$, $5^{AS}$, $6^S$, $7^S$, $8^S$, $9^S$ and $10^S$ thrown into operation. Some of the arms (lettered "AS") perform a double function that is, act for both addition and subtraction in connection with different linkages. The movement of the rock shafts 63 will also bring the pin-restoring arms $1^R$ to $11^R$ on the rock shafts into engagement with the pin-restoring linkages 172 and 173. The pin-setting linkages and the rock-shafts for operating the same will thus be arranged to set up the pins according to the complements of the keys struck instead of the exact value of the key struck.

The rearward motion of the subtraction key, in addition to arranging the pin-setting linkages according to their subtraction action, caused the pawl 136 to temporarily cam up the frame 138 so as to lift all of the pin-bearing rack bars, with the exception of the units of pence rack bar which is opposite a cut-out portion in the bar 146, and concomitantly depress the link 144 on the $9^L$ pin-setting linkage, thereby setting all of the pins corresponding to the "9" pin in a decimal system, that is, all of the pins of highest ultimate value on all of the pin-bearing rack bars, with the exception of the units of pence rack bar.

The $9^L$ linkage also, at this time, sets up the solitary pin on the rack bar engaging the computing wheel of highest order, so as to give it likewise nine-tenths of a revolution. Inasmuch as this rack bar is never raised by a linkage actuated from the tappet on the carriage, this pin will not be restored during the subsequent setting up of the pins. The $9^L$ linkage also sets up the solitary pin 86 on the extra rack bar 85 engaging the blank dial wheel of lower order than the farthings dial wheel. Because of the projection 89 on the general operator, this pin 86 corresponds to a "10" pin, although it is arranged in alinement with the "9" pins. All such rack bars as have not had pins set thereon by the actuation of the numeral keys, will rotate the associated dial wheels an amount corresponding to one less than a cycle of the particular dial wheel. By cycle it is not meant to imply in all cases a complete rotation, but merely a movement corresponding to the exchange value from that dial wheel to the next higher dial wheel. For example, four steps of the farthings dial wheel is a cycle for that wheel although it would take twelve steps to give a complete revolution thereof.

Incidently the shifting of the frame 138 changes the bichrome mechanism, through the intermediary of the connecting linkages, from a state for printing black to a state for printing red. The movement of the shifting bar 133 to change the character of action of the pin-setting linkages, also shifted, through the intermediary of the arm 157 and the lever 159, the two fingers 155 and 156, so that the latter moves to an ineffective position between the tens of pence rack bar 72 and the shillings bar 73 while the broader finger 155 moves from a position coöperating with the units of pence rack bar 71 to a position coöperating with the tens of pence rack bar 72. This enables the tens of pence rack bar to be raised when writing in the units of pence column, while no rack bar is raised when writing in the tens of pence column, the units of pence rack bar being silent during the subtraction operation. Inasmuch as the tens of pence bar has eleven pins, this operation can be readily carried out, the only difference being that when one is subtracted, the normal "1" key is struck, and when eleven is subtracted, the special "1" key 197 is struck when writing in the units of pence column.

As each numeral key is struck in the successive columns in the computing zone, the complement of the value of the key, using one less than the exchange value as the base or complete number, is set up on the proper rack bars in order. The accumulated computation is run up on the computing wheels in the usual manner by the actuation of the crank 82 which actuates the general operator. At the same time, the special dial wheel on the lower side of the farthings wheel is rotated one complete revolution, so that its tens-carrying mechanism is set to carry one to the farthings wheel. Also the highest denomination dial wheel, in this instance the millions of pounds dial wheel, is rotated nine-tenths of a revolution, so that all of the dial wheels will be rotated one complete revolution less the value of the numbers struck in each column corresponding to each individual dial wheel. This is the same as if the dial wheels had rotated backward the exact amount corresponding to the numeral key struck in the several columns corresponding to the dial wheels. As the general operator completes its return movement, during which the carry over operation also takes place, it actuates the pin-restoring plate 121, so as to restore all of the set pins to their normal position. This action causes the wrist 183 to trip the detent 148, permitting the subtraction key to return under the tension of its spring 199. This permits the spring 185 to return the shift bar 133 to its normal position, thereby returning the shafts 63 and the associated arms to their normal position corresponding to adding. The initial forward movement of the general operator forced the bell crank 188 up out of the socket 186, so that the connected arm 191 struck the finger 192 to depress the link 151, whereby the bichrome mechanism was shifted to its "black" printing position. The entire mechanism will then be in condition to add and to print in black. It will be seen that it is necessary to actuate the subtraction key for each new subtracting operation.

Variations may be resorted to within the scope of the invention, and portions of the improvements may be used without others.

Having thus described my invention, I claim:

1. In a computing machine, the combination with a device adapted to compute both integers and fractions, of settable members alined in each denomination for integers, a single set of setting members, keys for operating said setting members, other settable members for fractions, all said setting members normally alined to be effective on settable members of their value, and connections whereby, in computing certain fractions, certain setting members are effective on settable members alined for other values.

2. In a computing machine, the combination with a device adapted to compute both integers and fractions, of settable members alined in each denomination for integers, a single set of setting members, keys for operating said setting members, other settable members for fractions, all said setting members normally alined to be effective on settable members of their value, connections whereby, in computing certain fractions, certain setting members are effective on settable members alined for other values, computing wheels, and a general operator for driving said computing wheels by said settable members to an extent determined by the members set, so as to be first operated on by said general operator.

3. The combination with a series of bars having pins thereon settable to accumulate a preliminary representation of a computation, of linkages for setting said pins, said pins being settable by coöperative movement of said bars and said linkages, and a bar for causing a movement of all but one of said pin bars.

4. The combination with a series of bars having pins thereon settable to accumulate a preliminary representation of a computation, of linkages for setting said pins, said pins being settable by coöperative movement of said bars and said linkages, and a bar for causing a movement of all but one of said pin bars; said last-mentioned bar having a cut-out portion or groove arranged in opposition to one of said pin bars.

5. The combination with a computation accumulating means having members corresponding to each order or denomination of a system, of means for concomitantly changing the character of computation and rendering ineffective one of the members corresponding to a certain order.

6. The combination with a computation accumulating means having members corresponding to the several orders of the English or sterling system, of mechanism for silencing at will the member corresponding to the units of pence order.

7. The combination with a series of pin-bearing order bars having the highest valued pins on certain of the bars offset with respect to the highest valued pins on certain others of the order bars, of means for setting concomitantly a plurality of said highest valued pins offset with respect to each other.

8. The combination with a series of bars, of a plurality of pins on said bars, the pins on said bars varying in number according to one less than the exchange value between the several orders of the English or sterling monetary system, the pins of highest value on certain of the bars being out of alinement with the pins of highest value on certain others of the bars, and means for simultaneously setting a plurality of the disalined pins of highest value.

9. The combination with a computation accumulating means including a plurality of pin-bearing order bars and of a plurality of pin-setting linkages, a subtraction key for changing the character of action of said pin-setting linkages, a pawl operated by said subtraction key, a cam engaged by said pawl, a frame connected so as to be shifted when said pawl actuates said cam, a bar underlying said pin-bearing bars actuated by said frame, and means actuated by said frame for actuating one of said pin-setting linkages.

10. The combination with a computation accumulating mechanism including a plurality of pin-bearing order bars and a plurality of pin-setting linkages, of a subtraction key for changing the character of action of said pin-setting linkages, a rock frame, a cam projection on said rock frame, a member actuated by said key to engage said projection and rock said frame, a bar on said rock frame underlying said pin-bearing order bars, and a thrust rod actuated by said rock frame and overlying one of said pin-setting linkages.

11. The combination with a computation accumulating mechanism including a plurality of pin-bearing order bars and a plurality of pin-setting linkages, of a subtraction key for changing the character of action of said pin-setting linkages, a rock frame, a cam projection on said rock frame, a member actuated by said key to engage said projection and rock said frame, a bar on said rock frame underlying said pin-bearing order bars, and a thrust rod actuated by said rock frame and overlying one of said pin-setting linkages; said last-mentioned bar having a cut-out portion arranged in apposition to one of said pin-bearing order bars enabling the same to remain passive while the other pin-bearing order bars are actuated.

12. The combination with a computation accumulating means including a series of pin-bearing order bars and a series of pin-setting linkages, of a subtraction setting mechanism for changing the state of said pin-setting linkages, a rock frame, a bar arranged to actuate concomitantly a plurality of pin-bearing order bars and actuated by said frame, a cam projection on said frame, a one-way pawl arranged to engage said projection to rock said frame when engaging said projection on one side and arranged to slip idly past said projection when engaging the same on the opposite side, and means actuated by said rock frame arranged to actuate one of said pin-setting linkages.

13. The combination with a computation accumulating means including a plurality of pin-bearing order bars and a plurality of pin-setting linkages, of a subtraction key, a thrust rod operated by said key, a pawl pivotally mounted on said thrust rod, means for holding said pawl against movement in one direction, spring means for yieldingly permitting a movement of said pawl in the opposite direction, a rock frame having an inclined projection thereon engageable by said pawl, and means actuated by said rock frame for lifting certain of said order bars and actuating a certain one of said linkages.

14. In a computing machine, the combination with computing wheels adapted to compute both integers and fractions, of keys, a traveling carriage, setting members controlled by said keys, settable pins apposite to said setting members for integers and fractions, denominational bars carrying said settable pins so that a pin is normally adapted to be set by its apposite setting member if the denomination is selected by said carriage, and connections whereby, in computing certain fractions, certain setting members are effective on pins apposite to other setting members.

15. The combination with an order bar bearing pins, of linkages adapted to strike certain of said pins to set them into abnormal position on said bar, and connections extending away from at least one pin and adapted to be struck by a linkage unable to strike said bar to effect a setting of that pin.

16. The combination with a plurality of pin-bearing order bars, of linkages for setting the pins on said order bars by direct contact with said pins, and interponent means between said pins and said linkages for enabling said linkages to set certain of said pins indirectly.

17. The combination with a plurality of pin-bearing order bars, of pin-setting linkages, and means to enable a plurality of linkages to set the same pins.

18. The combination with pin-bearing order bars, of linkages, means for setting said pins directly by said linkages, and means for setting certain of said pins indirectly by said linkages.

19. The combination with a bar bearing nine pins, of a bar bearing eleven pins, a bar bearing three pins, the ninth pin and the eleventh pin on said first and second-mentioned bars being arranged in alinement with each other, a linkage for setting said ninth and eleventh pins, and a leverage extending from said third pin to a point underlying said pin-setting linkage, so that said third pin can be set concomitantly with the setting of said ninth and eleventh pins.

20. The combination with a bar bearing eleven pins, of a bar bearing nine pins, the eleventh pin on said first-mentioned bar being arranged in alinement with the ninth pin on said second-mentioned bar, and a single linkage capable of setting said ninth pin and said eleventh pin concomitantly.

21. The combination with a plurality of bars bearing respectively one, three, nine and eleven pins, the highest valued pin on certain of the bars being arranged in alinement with each other and out of alinement with the highest valued pin on certain of the other bars, of means for concomitantly setting the highest valued pin on all of the bars.

22. In a computing machine, the combination with a bar, of a plurality of pins settable thereon to represent a portion of a computation, linkages for setting said pins, certain of said pins being on one side of said bar, levers extending lengthwise of said bar adapted to be impinged by said linkages for setting said pins, a pin on the opposite side of said bar, and a lever also adapted to be impinged by a linkage for setting said pin, said lever adapted to move independently of the other levers, being separated therefrom by the bar.

23. A computing mechanism for a system having irregular exchange values between the several orders or denominations, comprising a series of members corresponding to the several denominations or orders and having variable numbers, of settable elements, to wit one less than the exchange value between each order and the next higher order, actuating means for setting said elements to afford a preliminary representation of a computation, numeral keys for operating said actuating means, and state controlling mechanism selectively enabling the setting of said elements according to the numerical value of the key struck, or according to the complement of a numerical value of the key struck, using one less than the exchange value between each order and the next higher order as the base or complete number.

24. A computing mechanism capable of subtracting in a system having irregular exchange values between the several orders or denominations, comprising a computing head having a series of computing wheels corresponding to the several orders, a series of numeral keys, certain of said computing wheels having more than one cycle of values for a complete circumference, and means for rotating said computing wheels complete cycles less the value of the numbers struck by said keys in accordant denominations or orders.

25. The combination with a plurality of pin-bearing order bars, certain of which have pins of the same value located out of alinement with each other, of a plurality of sets of linkages for said disalined pins of the same value, and numeral keys common to said linkages for actuating said linkages to set up pins of the corresponding value.

26. The combination with a series of pin-bearing bars, of linkages for setting pins corresponding to the values "1" to "9", and extra linkages for setting pins corresponding to the values "1" and "2".

27. The combination with a series of pin-bearing bars, of a series of numeral keys, means for concomitantly setting certain pins on certain of said bars, and means actuable at the actuation of the "0" key to unset said pin solely on a certain one of said bars.

28. The combination with a tens of pence bar having eleven settable pins thereon, of means for setting the eleventh pin, a pin-restoring means actuable by any of said numeral keys with the exception of the "0" key for restoring said eleventh pin, and pin-restoring means actuable by the "0" key for restoring said eleventh pin.

29. The combination with computing accumulating mechanism, including a series of preliminary representation members adapted to afford a preliminary representation of a computation and arranged according to orders or denominations, and setting mechanism for said preliminary representation members, of means for actuating said members one by one in successive order, and mechanism selectively effective to enable the prevention of the actuation of certain of said members.

30. The combination with computing accumulating mechanism, including a series of preliminary representation members adapted to afford a preliminary representation of a computation and arranged according to orders or denominations, and setting mechanism for said preliminary representation members, of means for actuating said members one by one in successive order, and mechanism for delaying the activity of one of said members from its own order to the normal period of activity of the next order.

31. The combination with a series of computation accumulating members arranged according to the several orders of a system of measurements of means for successively operating said members in order, and mechanism for silencing a certain one of said members and enabling the activity of the next adjacent member in the period in which said certain member is normally active.

32. The combination with a typewriting mechanism, of a computing mechanism including a series of members arranged according to the orders or denominations of a system of measurements, means for operating said members successively from the typewriting mechanism as typewriting is done in the corresponding orders, and means for concomitantly changing the character of computation of said computing mechanism and changing the sequence of actuation of said members from said typewriting mechanism.

33. A computing mechanism arranged to perform either adding or substracting, comprising a series of computation accumulating means arranged according to the successive orders of the system being computed in, certain of said members being actuated in the different period or order for subtraction than for adding, and subtraction-setting mechanism for enabling the change from addition to substraction.

34. The combination with a typewriting mechanism, of a computing mechanism including a series of members for affording a preliminary representation of a computation, means for actuating said members from said typewriting mechanism according to a certain order or sequence, and means for changing the order or sequence of actuation of said members from said typewriting mechanism.

35. The combination with a typewriting mechanism, of a computing mechanism including a series of members arranged according to the denominations or orders of a system of measurements, a series of linkages from said typewriting mechanism to said members, one for each of said members, whereby said members may be actuated from said typewriting mechanism according to a predetermined sequence, and means for enabling one of said linkages normally actuating a certain of said members to actuate a certain other of said members.

36. The combination with a series of members arranged according to the orders or denominations of a system of measurements and adapted to afford a preliminary representation of a computation, of a series of linkages individual to each of said members arranged to actuate said members, a finger carried by each of said linkages and engaging one of the apposite members, and means for shifting certain of said fingers from contact with certain of said members to contact with certain others of said members, whereby certain of said linkages may selectively operate a plurality of said members.

37. The combination with a series of members arranged according to the orders or denominations of a system of measurements and adapted to afford a preliminary representation of a computation, of a series of linkages individual to each of said members arranged to actuate said members, a finger carried by each of said linkages and engaging one of the apposite members, and means for shifting certain of said fingers to an inactive position enabling certain of said members to remain passive.

38. A computing mechanism arranged to compute in a system of measurements having irregular exchange values between the several orders of the system, including a pair of members for affording a preliminary representation of a computation, means for enabling both of said members to be active during one type of a computation, and means for silencing one of said members during another type of computation.

39. The combination with a series of pin-bearing bars, of mechanism for setting the pins on said bars, and means for actuating said bars to enable the pins to be set thereon, certain of said means having shiftable interponents enabling a variation in the order of actuation of said bars by said means.

40. The combination with a series of pin-bearing bars, of mechanism for setting the pins on said bars, means for actuating said bars to enable the pins to be set thereon, certain of said means having shiftable interponents enabling a variation in the order of actuation of said bars by said means, and mechanism for varying the character of computation connected to adjust said shiftable interponents.

41. The combination with a plurality of computation accumulating members, of means for actuating said members to enable the accumulation of a computation thereon, said means including a plurality of shiftable interponents having a fixed movement, and certain of which being of insufficient magnitude to move from one member to the next adjacent member, and certain of which being of sufficient magnitude for said fixed movement to move from engagement with one of said members to engagement with another of said members.

42. The combination with a series of pin-bearing rack bars, of means for setting pins on said rack bars, linkages for actuating said rack bars to enable the setting of pins thereon, certain of said linkages having shiftable interponents enabling certain of said linkages to actuate selectively more than one of said bars, and means for shifting said interponents along said linkages.

43. The combination with a typewriting mechanism including a carriage, of a series of jacks arranged to be actuated by the movement of said carriage, a computing mechanism including a series of pin-bearing rack bars, mechanism for setting the pins on said rack bars, a series of linkages actuated by said jacks and arranged to actuate said pin-bearing bars to enable the pins to be set thereon, certain of said linkages having shiftable fingers arranged to change their engagement with certain of said bars, mechanism for changing the setting of said pins for different types of calculation, and means actuated by said last-mentioned mechanism to shift said fingers.

44. The combination with a typewriting mechanism including shifting means to enable the change between upper and lower case characters, of a computing mechanism including a series of order members, and means to enable said shifting means to move one of said members.

45. The combination with a typewriting mechanism including keys, and shifting mechanism for enabling the change between the writing of upper and lower case characters, of a computing mechanism including a series of order or denomination members, means for synchronizing the actuation of said order members with the typewriting in the corresponding orders by said typewriting mechanism, and means dependent on the conjunctive action of said case-shifting mechanism and said order synchronizing means for positively moving a certain one of said members.

46. The combination with a typewriting mechanism including a case-shifting mechanism to enable the change in writing between upper and lower case characters, of a computing mechanism including a series of order or denomination members, shifting means for a certain one of said order members, means actuated by said typewriting mechanism for positioning said shifting means in coöperative relation with respect to said certain order member, and means for enabling said case-shifting mechanism to operate said shifting means.

47. The combination with a typewriting mechanism including a case-shifting mechanism arranged to enable the change between the writing of upper and lower case characters, of computing mechanism including a series of order or denomination members, shifting means for a certain one of said order members normally located in an inoperative position with respect thereto, means actuable from said typewriting mechanism for positioning said shifting means in an operative relation with respect to said certain order member when typewriting in the corresponding order, and means actuated by said case-shifting mechanism for manipulating said shifting means to operate said certain order member.

48. The combination with a typewriting mechanism including a case-shifting mechanism arranged to enable the change between the writing of upper and lower case characters, of computing mechanism including a series of order or denomination members, shifting means for a certain one of said order members normally located in an inoperative position with respect thereto, means actuable from said typewriting mechanism for positioning said shifting means in an operative relation with respect to said certain order member when typewriting in the corresponding order, means actuated by said case-shifting mechanism for manipulating said shifting means to operate said certain order member, and means for automatically returning said last-mentioned means to a normal position.

49. The combination with a typewriting mechanism including a case-shifting mechanism for enabling the change between the writing of upper and lower case characters, of a computing mechanism including a series of order members, a hook for actuating a certain one of said order members normally located out of reach of said certain order member, means for actuating said hook from said case-shifting mechanism, and shiftable means operable from said typewriting mechanism for moving said hook within striking distance of said certain order member when writing in the column corresponding to the order of said order member.

50. The combination with a typewriting mechanism including a case-shifting mechanism for enabling the change between the writing of upper and lower case characters, of a computing mechanism including a series of order members, a hook normally located out of striking distance of a certain one of said order members, means for operating said hook from said case-shifting mechanism, a jack operable from said typewriting mechanism, a linkage operated by said jack, an arm operable by said linkage, and means connecting said arm to said hook enabling said arm when actuated to move said hook within striking distance of said certain order member, whereby said order member can be actuated from said case-shifting mechanism.

51. The combination with a typewriting mechanism including a case-shifting mechanism for enabling the change between the writing of upper and lower case characters, of a computing mechanism including a series of order members, a hook normally located out of striking distance of a certain one of said order members, means for operating said hook from said case-shifting mechanism, a jack operable from said typewriting mechanism, a linkage operated by said jack, an arm operable by said linkage, means connecting said arm to said hook enabling said arm when actuated to move said hook within striking distance of said certain order member, whereby said order member can be actuated from said case-shifting mechanism, and a spring for returning said hook to a normal position.

52. In a sterling or English computing mechanism, the combination with typewriting mechanism arranged to write farthings as fractions of a penny with upper case characters, including shifting mechanism to enable the writing of upper case characters, of computing mechanism including a farthings order member, and means for enabling the shifting of said farthings order member by said shifting mechanism when writing in the farthings column.

53. The combination with a farthings bar having a plurality of pins thereon, of means for setting all of said pins directly, and means for setting all of said pins indirectly.

54. A farthings bar having three pins corresponding to "1", "2" and "3" respectively, said pins having levers connected thereto so that said pins can be set from a point distant therefrom.

55. The combination with a bar having a pin thereon, of a lever connected to said pin, means for actuating said lever to manipulate said pin, a lever connected to actuate said first-mentioned lever, and means for actuating said second-mentioned lever to adjust said pin.

56. The combination with a bar having a plurality of settable pins thereon, of a series of linkages superposed above said bar, some of said linkages being directly above said pins and capable of directly setting said pins, certain others of said linkages being exjacent said pins, and means to enable said certain exjacent linkages to set said pins.

57. The combination with a computation accumulating member having eleven digit representatives for affording a preliminary representation of a computation, means for setting said digit representatives, and eleven different keys for actuating said means.

58. The combination with a plurality of bars having pins settable thereon, of a general operator for actuating said bars by engaging said pins, said general operator having pin-engaging portions thereon at different distances from the pins on certain of said bars than from the pins on certain others of said bars.

59. The combination with a series of rack bars having pins settable thereon to determine the extent of movement of the rack bars, of a general operator for advancing said rack bars by engagement with said pins, said rack bars having pins of different values on different bars in alinement with each other, and means carried by said general operator for enabling a definite movement of said general operator to produce variable movements of certain of said rack bars by engagement with alined set pins on the different rack bars.

60. The combination with a series of bars having pins settable thereon to determine the extent of movement of said bars, of a general operator for moving said bars by engagement with said pins, said general operator having an engaging edge, to contact with said pins, with a projection extending in advance of said engaging edge to form a point of contact with the pins on one of said bars.

61. The combination with a series of bars having pins settable thereon to determine the extent of movement of said bars, of a general operator for moving said bars by engagement with said pins, said general operator having an engaging edge, to contact with said pins, with a plurality of projections extending in advance of said engaging edge to form contacting points with the pins on certain of said bars, so that said certain bars will have a greater corresponding movement in the setting of certain corresponding pins than other bars.

62. The combination with a series of bars having pins settable thereon to determine the extent of movement of said bars, of a general operator for moving said bars by engagement with said pins, said general operator having an engaging edge to contact with said pins with a projection extending forwardly from said engaging edge a distance equal to the distance between two pins, so as to form a contacting point to engage the pins on a certain one of said bars to give said certain bar a possible movement two points greater than any other bar.

63. The combination with a series of bars having pins settable thereon to determine the extent of movement of said bars, a certain one of said bars having a pin corresponding to a value of eleven in alinement with pins on others of said bars corresponding to a value of nine, and another certain of said bars having a pin thereon corresponding to a value of ten in alinement with pins on others of said bars corresponding to a value of nine, and a general operator for actuating said bars by engagement with said pins having an irregular contacting edge to compensate for the alinement of unequal valued pins.

64. The combination with a computation accumulating means having digit representatives of different value on different elements in alinement with each other, and a general operator for actuating said computation accumulating means by engagement with said representatives having compensating means to allow for the alinement of representatives having different values.

65. The combination with a typewriting mechanism including a bichrome shift for either printing in red or black, of a computing mechanism including a subtraction key, a thrust-rod connected to said key, a pawl on said thrust rod, a shift frame, a projection lying in the path of said pawl mounted on said shift frame enabling said pawl to rock said shift frame when actuated by the movement of said subtraction key, a bell crank actuated by the shifting of said frame, and a link connecting said bell crank with said bichrome mechanism enabling the change from printing in one color to the printing in another color when said subtraction key is actuated.

66. The combination with a computing mechanism, of a "0" key, and means to enable the "0" key to cause an accumulation of a computation in said computing mechanism.

67. In a computing machine adapted to compute English money, the combination with a bar for computing units of pence, and ineffective in itself, of a tens of pence bar, and means enabling said units bar to act through the intermediary of the tens of pence bar.

68. The combination with a computing head, of mechanism for running up a computation on said computing head, said computing head comprising a series of active computing wheels, a blank wheel of lower order than any of the active wheels, and tens carrying mechanism from said blank wheel to the next higher wheel, and from every other wheel to the next higher wheel.

69. The combination with a typewriting mechanism, of a computing mechanism having an element arranged to compute values represented by upper case characters, and means for rendering said element subservient to the action of said upper case-shifting mechanism.

70. The combination with a computing mechanism having denominational members corresponding to the several orders of the English or sterling monetary system, of mechanism for silencing the denominational member corresponding to the units of pence order while maintaining the remaining denominational members free for action.

71. The combination with a computing mechanism having a series of denominational members corresponding to the several orders of the English or sterling monetary system, including the units of pence and the tens of pence orders, of means for bringing each of said members into play at predetermined periods, and mechanism for bringing one of said pence order members into action in the period normally corresponding to the activity of the other of said pence order members.

72. The combination with a computing mechanism having a series of denominational members corresponding to the several orders of a system of measurements, of means for bringing said members into play at predetermined successive periods, and mechanism for changing the successive order of bringing into play of said denominational members.

73. A computing mechanism comprising a plurality of order members, each having one or more pins settable thereon to determine the extent of movement of the associated order member, the number of pins on each order member varying to correspond to one less than the exchange value between that order and the next higher order, and means for setting said pins according to their complementary values.

74. The combination of a series of denominational members corresponding to the different orders of an ultra-decimal system of measurements, each of said members having one or more pins settable thereon to determine the extent of movement thereof, the number of pins varying with the exchange values between the successive orders of the particular system of measurement, the highest valued pins of many of the members being arranged in alinement with each other irrespective of their relative values.

75. The combination with a series of denominational members corresponding to the different orders of an ultra-decimal system of measurements, each of said members having one or more pins settable thereon to determine the extent of movement thereof, the number of pins varying with the exchange values between the successive orders of the particular system of measurement, of means for concomitantly setting the pins of highest value on all of said denominational members irrespective of their relative values.

76. The combination with a series of denominational members corresponding to the several orders of an ultra-decimal system of measurements, said members having one or more pins settable thereon to determine the extent of movement thereof, the number of pins on the several denominational members varying with the exchange values between the several orders of the system, correspondingly valued pins on different denominational members being disalined with each other, of a set of linkages for setting said pins, there being one of said linkages for each of the values from "1" to "9", and an extra set of linkages for setting certain of said pins having values corresponding to pins with which they are disalined.

77. The combination with a denominational member in an ultra-decimal system having ten settable pins thereon corresponding to values from "1" to "10", of means individual to each of said settable pins for setting the same, and numeral keys from "0" to "9" for actuating said means individually to set said pins.

78. The combination with a series of computing wheels arranged to exhibit values in the several orders of an ultra-decimal system of measurements, of a series of numeral keys for controlling the extent of rotation of said computing wheels, and automatic means for enabling either the addition or the subtraction of the number corresponding to the value of an actuated numeral key by rotating said wheels solely in one direction.

79. The combination with a series of computing wheels, of rack bars for driving said computing wheels in the same direction for addition and subtraction, valuating or indexing devices for determining the extent of driving movements of said rack bars, each computing wheel and each rack bar representing one of a series of orders in an irregular system of measurement, the valuating or indexing devices for each order varying in number according to the exchange values between successive orders, a series of numeral keys, and setting mechanism adjustable so as to be subservient to said numeral keys, and so as to dominate said valuating or indexing devices, whereby said valuating or indexing devices may be controlled in correspondence with the direct values of the numeral keys actuated, or in correspondence with the complementary values of the numeral keys actuated using one less than the exchange value between the successive orders as the basis of obtaining the complement for each order or denomination.

80. In a computing machine for computing by the complementary method in an ultra-decimal system of relative exchange, the orders of which vary in range of values, comprising computing wheels, driving mechanism for said computing wheels, a series of numeral keys of different values, and ultra-decimal valuating or indexing mechanism for controlling the extent of driving movement of said driving mechanism selectively either according to the direct values of the numeral keys actuated or according to differential values corresponding in each instance to the difference of one less than the exchange value from each order in which a numeral key is actuated to the next higher order and the value of such numeral key.

81. The combination with a computing wheel, of a rack bar for driving said computing wheel, a series of ten pins on said rack bar corresponding in value from "0" up to "9," a series of ten numeral keys having values from "0" up to "9" connected to individually set pins of the corresponding values so as to afford computing drives of said computing wheel corresponding to the value of the key actuated, the "0" pin and the "0" key corresponding to a ten-point drive of the computing wheel by the rack bar.

82. The combination with a series of computing wheels, each corresponding to a denomination or order in a system of mensuration, of driving mechanism for said computing wheels, a wheel below the computing wheel of lowest denomination, means for rotating said last-mentioned wheel a complete revolution, and a carry-over mechanism from said last-mentioned wheel to the computing wheel of lowest denomination.

83. The combination with a units of pence computing wheel, of a tens of pence computing wheel, a units of pence computing bar having ten elements settable thereon to determine the extent of movement thereof, a tens of pence computing bar having eleven elements settable thereon to determine the extent of movement thereof, only one of said bars being connected to said pence wheels, and an interlocking connection between said bars enabling the driving of the one from the other.

84. The combination with a series of computing wheels, of indexing mechanism for driving said computing wheels variable amounts, including a series of linkages, a series of numeral keys ranging in values from "1" to "9," and connections from both the "1" key and the "9" key to the same setting linkage.

85. The combination with one or more pounds computing wheels, of a shillings computing wheel, a pence computing wheel, a farthings computing wheel, rack bars for driving said computing wheels, said rack bars having pins thereon varying in number to correspond with the carry-over value from each denomination to the next higher denomination, pins of different values on different bars being in some cases in alinement with each other, a series of linkages for setting said bars, a series of numeral keys for operating said linkages, and connections from numeral keys of different values to the same linkages enabling the setting of pins of different values in line with each other.

HANS HANSON.

Witnesses:
   F. E. ALEXANDER,
   JULIUS DUCKSTINE.